(12) United States Patent
Kurokawa

(10) Patent No.: US 11,634,183 B2
(45) Date of Patent: Apr. 25, 2023

(54) HOOD AND TRACTOR EQUIPPED WITH HOOD

(71) Applicant: YANMAR CO., LTD., Osaka (JP)

(72) Inventor: Yoshiaki Kurokawa, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 351 days.

(21) Appl. No.: 16/891,887

(22) Filed: Jun. 3, 2020

(65) Prior Publication Data

US 2020/0290684 A1    Sep. 17, 2020

Related U.S. Application Data

(63) Continuation of application No. 15/322,583, filed as application No. PCT/JP2015/067837 on Jun. 22, 2015, now Pat. No. 10,689,039.

(30) Foreign Application Priority Data

Jun. 30, 2014    (JP) ................................. 2014-135325
Jun. 30, 2014    (JP) ................................. 2014-135326

(Continued)

(51) Int. Cl.
*B62D 25/12* (2006.01)
*A01B 69/02* (2006.01)
(Continued)

(52) U.S. Cl.
CPC ............. *B62D 25/12* (2013.01); *A01B 69/02* (2013.01); *B60J 10/86* (2016.02); *B60R 19/52* (2013.01);
(Continued)

(58) Field of Classification Search
CPC ........ B62D 25/12; B62D 25/10; A01B 69/02; A01B 69/001; B60J 10/86; B60R 19/52; B60Q 1/0408; B60Y 2200/221
(Continued)

(56) References Cited

U.S. PATENT DOCUMENTS 6,401,851 B1    6/2002    Keen
7,918,594 B2    4/2011    Watanabe et al.
(Continued)

FOREIGN PATENT DOCUMENTS

CN    1342862 A    4/2002
EP    0501276 A2    9/1992
(Continued)

OTHER PUBLICATIONS

Chinese Office Action dated Jun. 12, 2018 issued in corresponding Chinese Application 201580035382.4 cites the patent document above.
(Continued)

*Primary Examiner* — D Glenn Dayoan
*Assistant Examiner* — Dana D Ivey
(74) *Attorney, Agent, or Firm* — Norton Rose Fulbright US LLP

(57) ABSTRACT

A hood of a tractor including a front grill, a light unit, and an upper cover is provided with a center pillar. The front grill is attached to the center pillar, the light unit is attached to the front grill, and the upper cover is supported by the center pillar. The hood is further provided with a side frame and a lower cover, where the side frame is attached to the center pillar, and the lower cover is attached to at least the upper cover and the side frame.

20 Claims, 37 Drawing Sheets

(30) Foreign Application Priority Data

Jun. 30, 2014 (JP) ................................ 2014-135327
Jun. 30, 2014 (JP) ................................ 2014-135328

(51) Int. Cl.
  *B62D 25/10* (2006.01)
  *B60J 10/86* (2016.01)
  *B60R 19/52* (2006.01)
  *B60Q 1/04* (2006.01)
(52) U.S. Cl.
  CPC ............ *B62D 25/10* (2013.01); *B60Q 1/0408* (2013.01); *B60Y 2200/221* (2013.01)
(58) Field of Classification Search
  USPC ..................................................... 296/193.11
  See application file for complete search history.

(56) References Cited

U.S. PATENT DOCUMENTS

| | | | |
|---|---|---|---|
| 8,430,195 | B2 | 4/2013 | Jansen et al. |
| 9,174,682 | B2 * | 11/2015 | Schmitz ................ B62D 25/10 |
| 2004/0216934 | A1 | 11/2004 | Tomiyama et al. |
| 2005/0211487 | A1 | 9/2005 | Obe et al. |
| 2010/0147613 | A1 | 6/2010 | Jansn et al. |
| 2014/0070569 | A1 | 3/2014 | Schmitz et al. |

FOREIGN PATENT DOCUMENTS

| | | |
|---|---|---|
| EP | 1103448 A1 | 5/2001 |
| EP | 1318939 B1 | 5/2005 |
| FR | 2850327 A1 | 7/2004 |
| JP | S6022562 A | 2/1985 |
| JP | S61-153651 U1 | 9/1986 |
| JP | H04303077 A | 10/1992 |
| JP | H0789456 A | 4/1995 |
| JP | 2001171563 A | 6/2001 |
| JP | 2003-320962 A | 11/2003 |
| JP | 2004224307 A | 8/2004 |
| JP | 2004314807 A | 11/2004 |
| JP | 2004314807 A * | 11/2004 |
| JP | 2005306055 A | 11/2005 |
| JP | 2006076571 A * | 3/2006 |
| JP | 2006-248491 A | 9/2006 |
| JP | 2010-006268 A | 1/2010 |
| JP | 2010-052593 A | 3/2010 |
| JP | 2010076486 A | 4/2010 |
| JP | 2010120456 A | 6/2010 |
| JP | 2010163036 A | 7/2010 |
| JP | 2010247670 A | 11/2010 |
| JP | 2011-126531 A | 6/2011 |
| JP | 2011207385 A | 10/2011 |
| JP | 2013-035307 A | 2/2013 |
| JP | 2014008900 A | 1/2014 |
| WO | 2006098079 A1 | 9/2006 |
| WO | 2012123332 A2 | 9/2012 |

OTHER PUBLICATIONS

Japanese Office Action dated Dec. 12, 2017 issued in corresponding Japanese Application 2014-135327 cites the patent document above.
Korean Office Action dated Mar. 29, 2018 issued in corresponding Korean Application 10-2017-7002194 cites the patent document above.
Office Action dated Jun. 12, 2018 for CN Application No. 201580035382.4.
Extended European Search Report corresponding to Application No. 15814956.7-1006/3162670 PCT/JP/2015/067837 dated Feb. 19, 2018.
Notification of Reasons for Refusal corresponding to JP Patent Application No. 2014-135327; dated Dec. 12, 2017.
Notification of Reasons for Refusal corresponding to JP Patent Application No. 2014-135328; dated Dec. 5, 2017.
International Search Report Corresponding to Application No. PCT/JP2015/067837; dated Aug. 18, 2015.

* cited by examiner

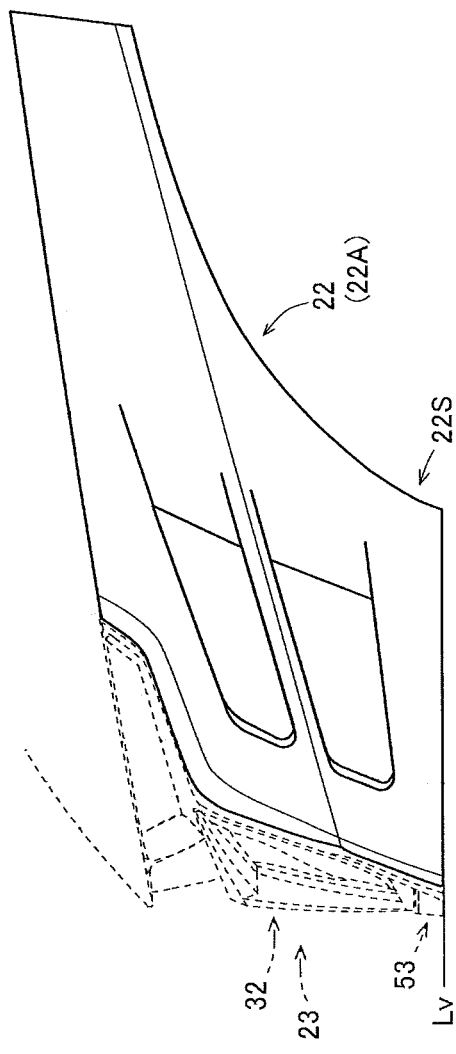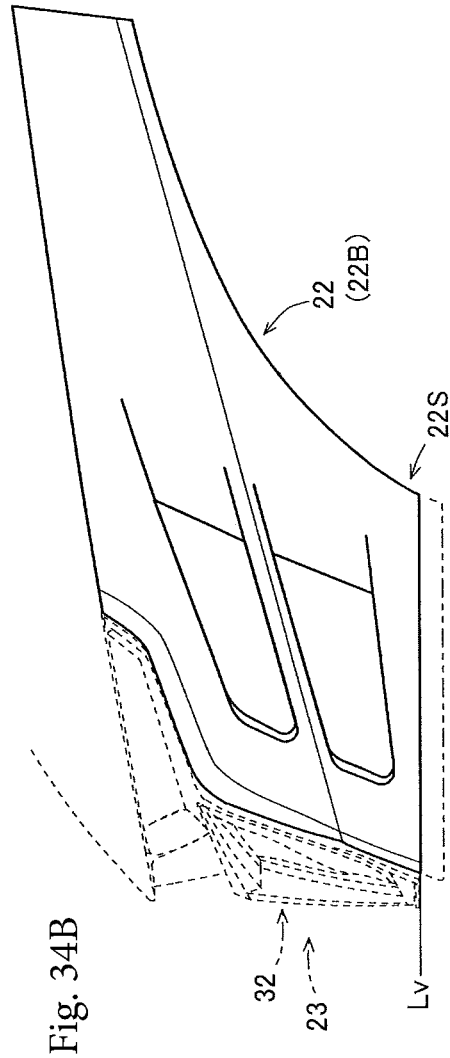

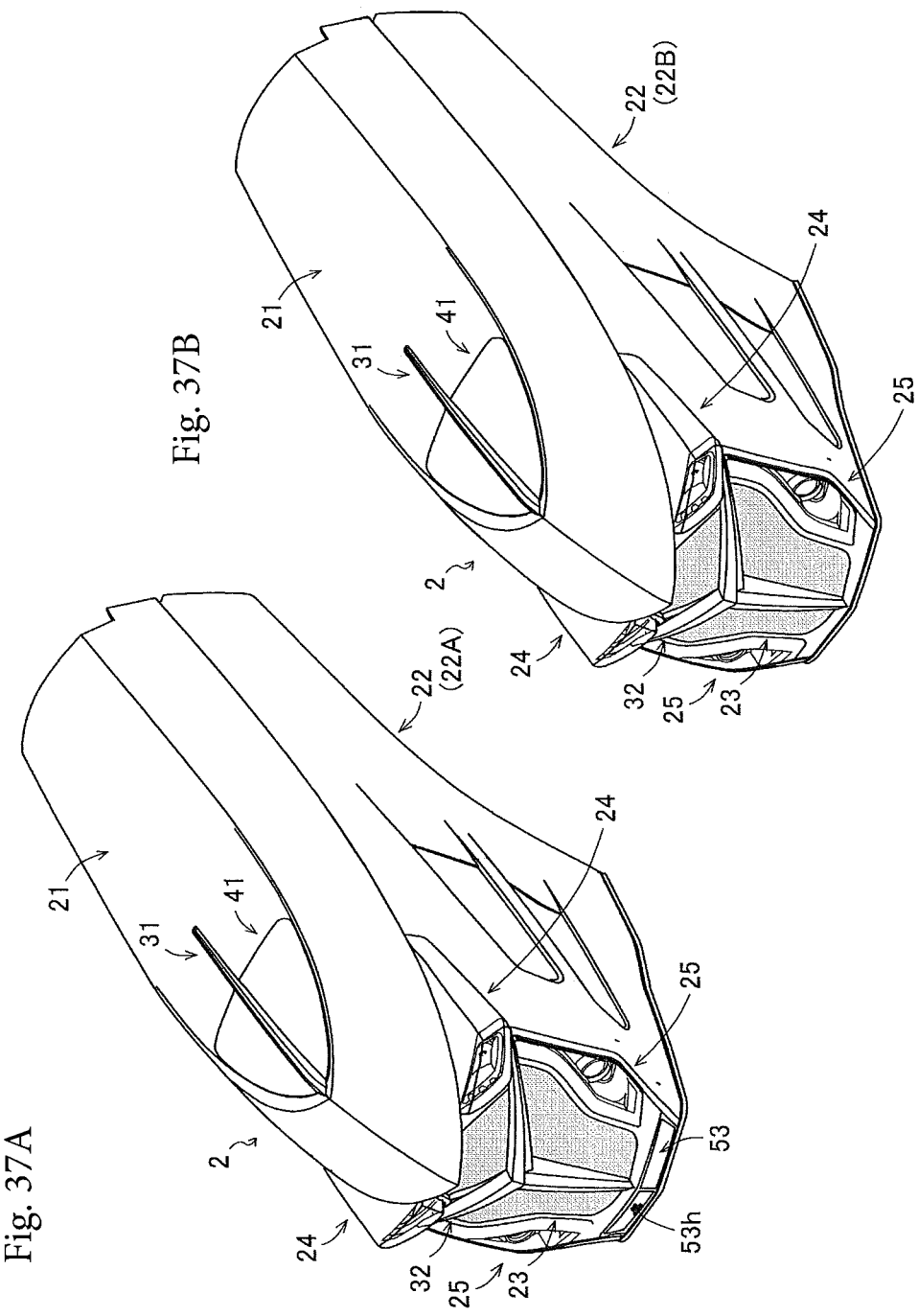

HOOD AND TRACTOR EQUIPPED WITH HOOD

CROSS REFERENCE TO RELATED APPLICATIONS

This application is a continuation of U.S. application Ser. No. 15/322,583 filed Dec. 28, 2016, which is the US national stage of International Application No. PCT/JP2015/067837 filed Jun. 22, 2015, which claims priority to JP Application No. 2014-135325 filed Jun. 30, 2014; JP Application No. 2014-135326 filed Jun. 30, 2014; JP Application No. 2014-135327 filed Jun. 30, 2014; and JP Application No. 2014-135328 filed Jun. 30, 2014; the disclosure of each application is incorporated herein by reference.

TECHNICAL FIELD

The present invention relates to a hood and a tractor equipped with a hood.

BACKGROUND ART

Conventionally, a tractor used in farmland is known (for example, see the Patent Literature 1). In a front part of the tractor, a hood is provided, and an engine is housed in the hood. The hood has a front grill.

Near the front grill, a light unit is arranged. Near the light unit, an upper cover and a lower cover are arranged. Accordingly, in the hood, overall assembly accuracy may be reduced by gap of attachment positions of these components. Therefore, the hood in which the attachment positions of the components are hard to be shifted so as to improve the assembly accuracy is desired. For realizing fine operability, the hood whose durability is improved further is desired.

Additionally, since the tractor travels on a muddy ground and a sloping ground, a travel direction tends to be shifted. Accordingly, an operator must operate the tractor to a destination while collecting the gap of the travel direction. However, when a target route is along a ridge, agricultural products may be trodden because of the slight gap of the travel direction. Accordingly, the tractor in which the travel direction can be determined easily and the gap of the travel direction can be collected suitably is desired.

PRIOR ART REFERENCE

Patent Literature 1: the Japanese Patent Laid Open Gazette 2010-163036 Disclosure of Invention.

SUMMARY OF THE INVENTION

The purpose of the present invention is to provide a hood in which attachment positions of components are hard to be shifted as to improve assembly accuracy. The purpose is to provide the hood whose rigidity is improved further so as to realize fine operability. Additionally, the purpose is to provide a tractor in which a travel direction can be determined easily and a gap of the travel direction can be collected suitably. As a result, the purpose is to provide the tractor which can be operated easily.

The first mode of the present invention is a hood of a tractor having a front grill, a light unit, and an upper cover, wherein a center pillar is provided, the front grill is attached to the center pillar, the light unit is attached to the front grill, and the upper cover is supported by the center pillar.

According to the first mode of the present invention, the hood according to the present invention includes the front grill, the light unit, and the upper cover. Furthermore, the hood according to the present invention includes the center pillar. The front grill is attached to the center pillar, the light unit is attached to the front grill, and the upper cover is supported by the center pillar. Accordingly, in the hood, an attachment position of the front grill to the center pillar is hard to be shifted, whereby assembly accuracy is improved. An attachment position of the light unit to the center pillar is hard to be shifted, whereby assembly accuracy is improved. Furthermore, an attachment position of the upper cover to the center pillar is hard to be shifted, whereby assembly accuracy is improved.

The second mode of the present invention is the hood according to the first mode wherein a side frame and a lower cover are provided, the side frame is attached to the center pillar, and wherein the lower cover is attached to at least the upper cover and the side frame.

According to the second mode of the present invention, the hood according to the present invention has the side frame and the lower cover. The side frame is attached to the center pillar, and wherein the lower cover is attached to at least the upper cover and the side frame. Accordingly, in the hood, an attachment position of the lower cover to the center pillar is hard to be shifted, whereby assembly accuracy is improved.

The third mode of the present invention is the hood according to the first or second mode wherein a middle member fixed to a reverse side of a middle part of the upper cover, an end member fixed to a reverse side of a rear end of the upper cover, a center beam, and a hood hinge are provided, the center beam connects the middle member to the end member, and the hood hinge is attached to the end member and the center beam.

According to the third mode of the present invention, the hood according to the present invention has the middle member fixed to a reverse side of a middle part of the upper cover, the end member fixed to a reverse side of a rear end of the upper cover, the center beam, and the hood hinge. The center beam connects the middle member to the end member, and the hood hinge is attached to the end member and the center beam. Accordingly, in the hood, the rigidity of the upper cover improved, and stress caused by moment is not accumulated to the vicinity of the end member and is dispersed to the vicinity of the middle member, whereby the hood is not distorted.

The fourth mode of the present invention is the hood according to the third mode wherein a weather strip is provided, and the weather strip is attached to the end member and contacts an air cut plate arranged near the end member.

According to the fourth mode of the present invention, the hood according to the present invention has the weather strip. The weather strip is attached to the end member and contacts the air cut plate arranged near the end member. Accordingly, in the hood, an attachment position of the weather strip is clear and attachment work of the weather strip is easy. When an operator looks into an inner side of the upper cover, the engine and the like cannot be cannot be seen because they are covered by the weather strip, whereby fine appearance of the hood can be realized.

The fifth mode of the present invention is the hood according to the third mode wherein a weather strip and a support plate fixed to the reverse side of the rear end of the upper cover are provided, and the weather strip is attached to the support plate and contacts an air cut plate arranged near the support plate.

According to the fifth mode of the present invention, the hood according to the present invention has the weather strip and the support plate fixed to the reverse side of the rear end of the upper cover. The weather strip is attached to the support plate and contacts the air cut plate arranged near the support plate. Accordingly, in the hood, an attachment position of the weather strip is clear and attachment work of the weather strip is easy. When an operator looks into an inner side of the upper cover, the engine and the like cannot be cannot be seen because they are covered by the weather strip, whereby fine appearance of the hood can be realized.

The sixth mode of the present invention is the hood according to the first or second mode wherein a center mark arranged in an upper part of the upper cover is provided, the center mark is arranged along a visual line of an operator looking a target route, and a ridgeline of the center mark draws an arc expanded upward.

According to the sixth mode of the present invention, the hood according to the present invention has the center mark arranged in an upper part of the upper cover. The center mark is arranged along the visual line of the operator looking the target route, and the ridgeline of the center mark draws the arc expanded upward. Accordingly, in the tractor having the hood, the target route can be grasped easily on the extension of the center mark regardless of height of the operator.

The seventh mode of the present invention is the hood according to the sixth mode wherein an opening is provided in the upper cover, a design panel closing the opening is provided, and the center mark is fixed to the design panel.

According to the seventh mode of the present invention, in the hood according to the present invention, the opening is provided in the upper cover, and the design panel closing the opening is provided. The center mark is fixed to the design panel. Accordingly, in the tractor having the hood, since the center mark serves as a handle, detachment/attachment work of the design panel is easy.

The eighth mode of the present invention is a tractor equipped with the hood according to one of first to seventh modes.

According to the eighth mode of the present invention, the tractor according to the present invention has the hood according to one of first to seventh modes. Accordingly, the tractor is more advantageous than the conventional tractor in respect of the above.

BRIEF DESCRIPTION OF DRAWINGS

FIGS. 34A and 34B are drawings of two lower covers.
FIGS. 37A and 37B are drawings of the state in which the hoods are completed.

DETAILED DESCRIPTION OF THE INVENTION

Technical thought of the present invention can be used for all agricultural machine vehicles and construction machine vehicles.

Firstly, a tractor 1 is explained.

Figure 1:
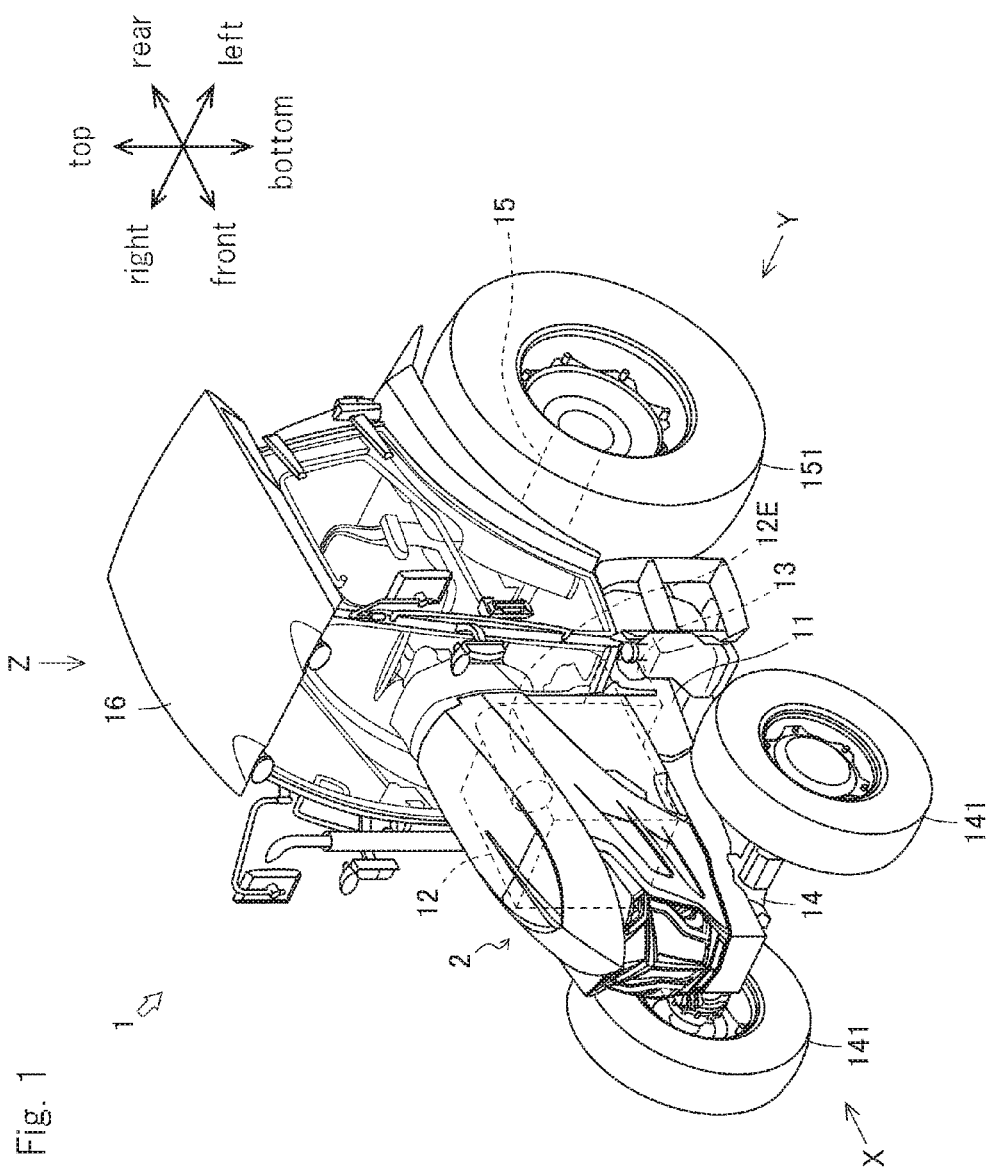
FIG. 1 is a drawing of a tractor.
Figure 2:
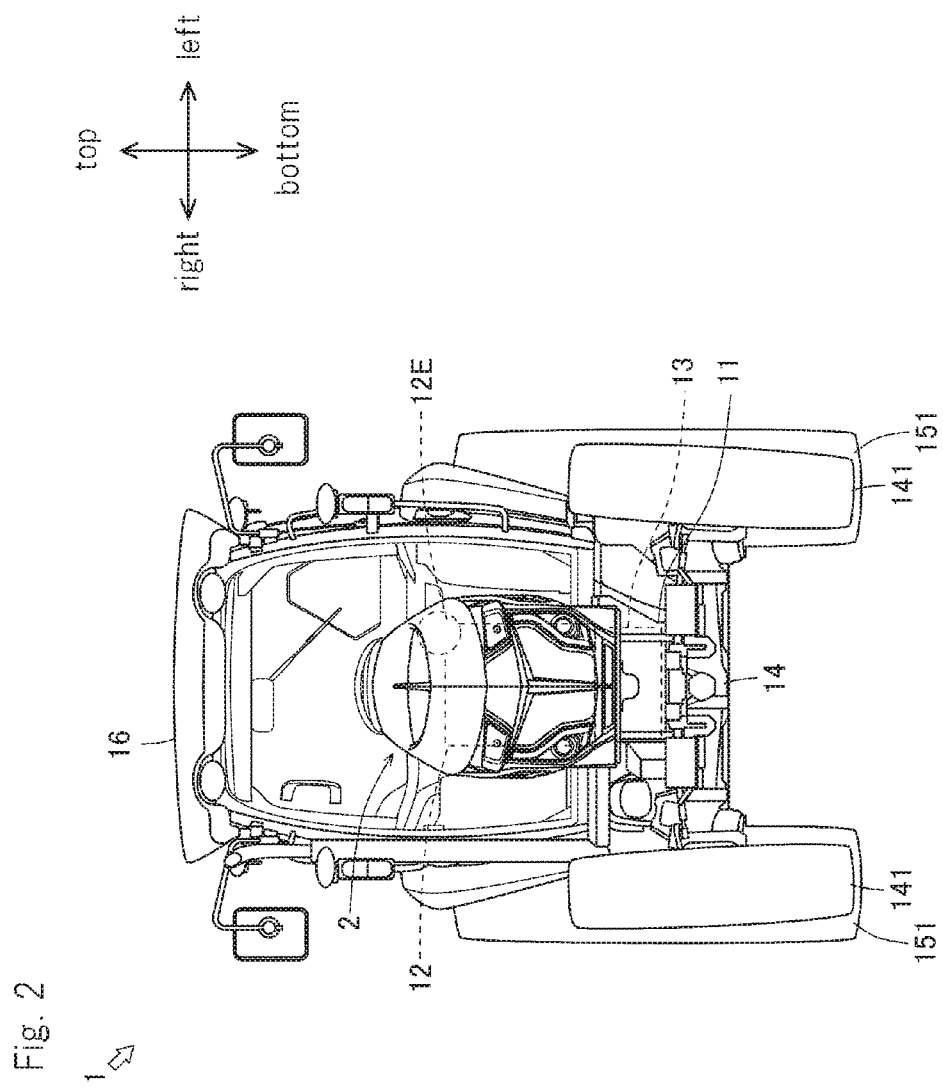
FIG. 2 is a drawing from a direction of an arrow X in FIG. 1.
Figure 3:
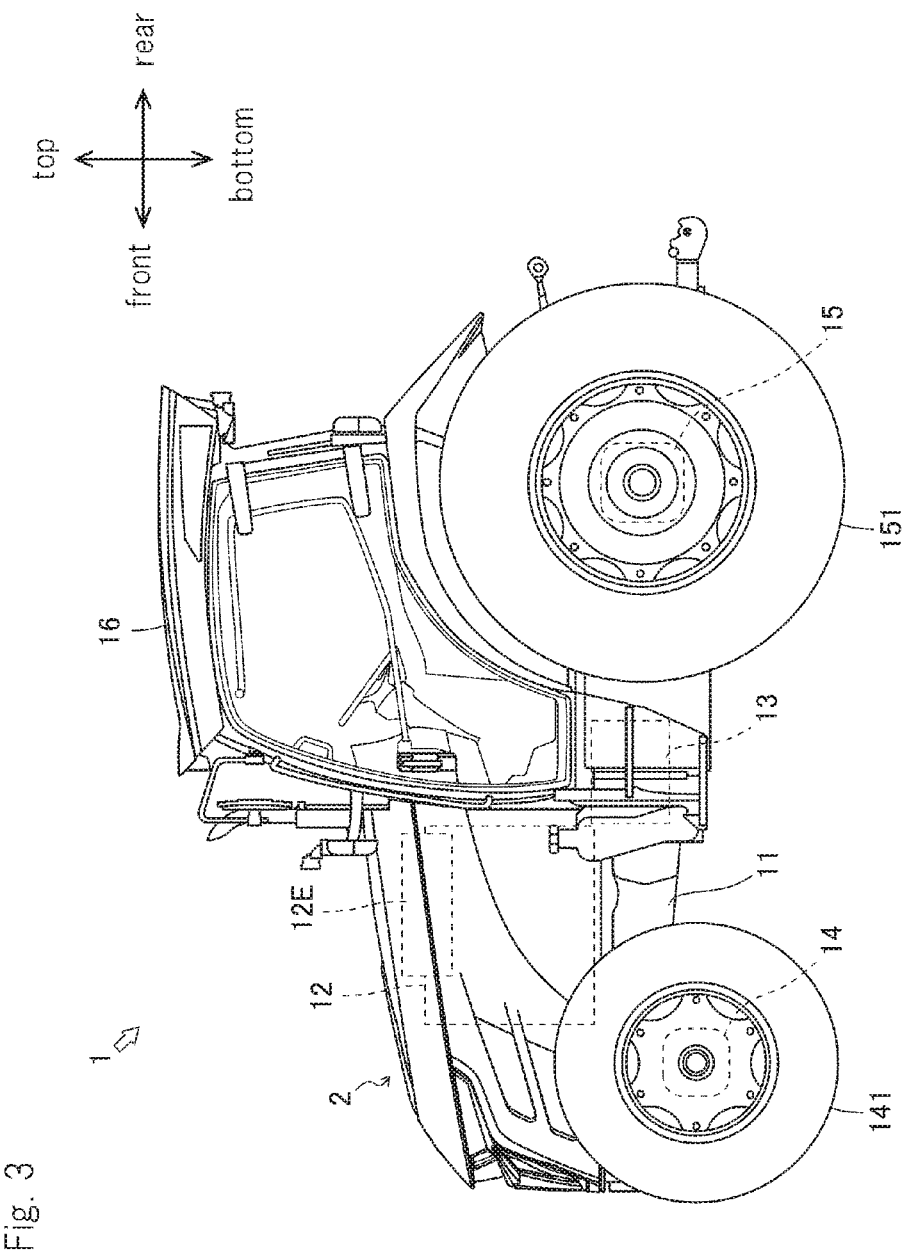
FIG. 3 is a drawing from a direction of an arrow Y in FIG. 1.
Figure 4:
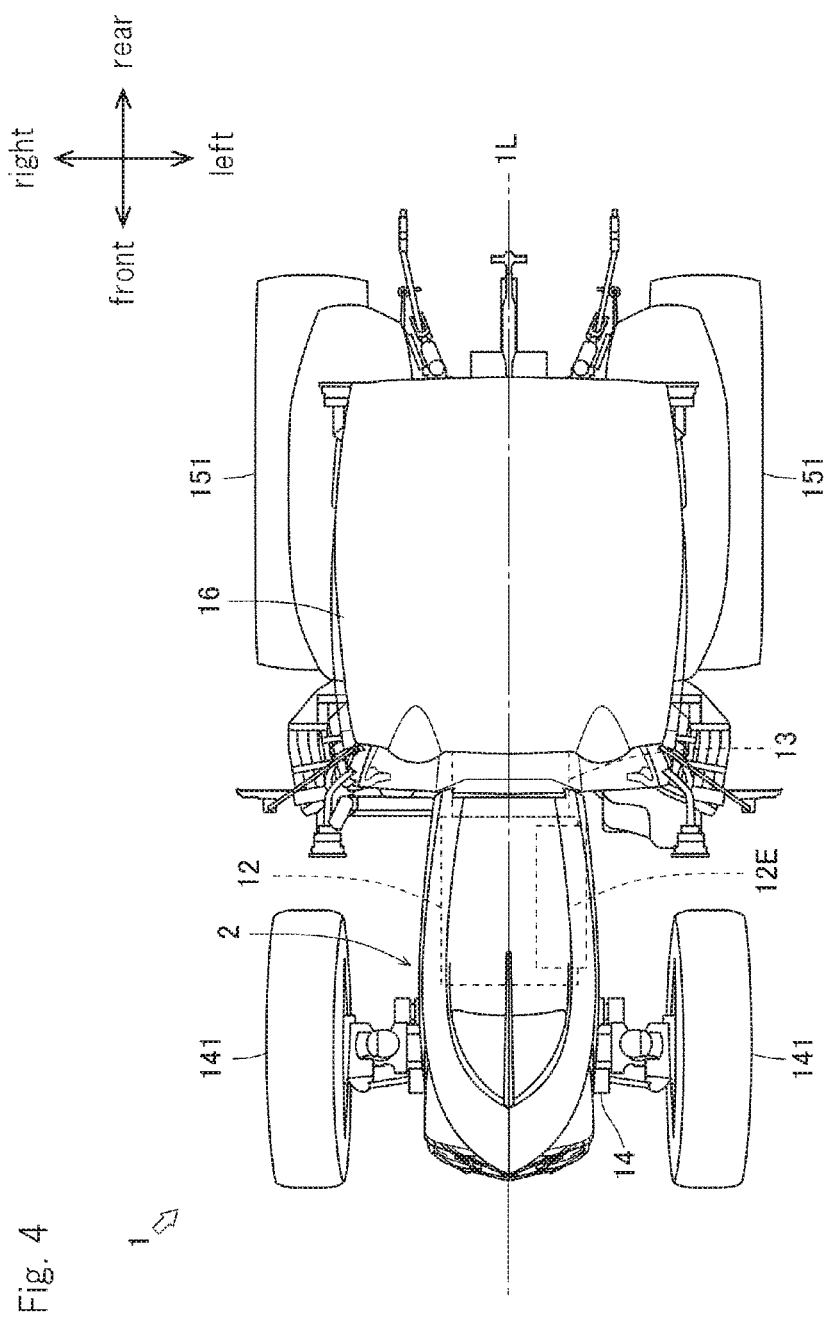
FIG. 4 is a drawing from a direction of an arrow Z in FIG. 1.

FIG. 1 shows the tractor 1. FIG. 2 is a drawing from a direction of an arrow X in FIG. 1, and FIG. 3 is a drawing from a direction of an arrow Y in FIG. 1. FIG. 4 is a drawing from a direction of an arrow Z in FIG. 1. In the drawings, longitudinal, lateral and vertical directions of the tractor 1 are shown.

The tractor 1 includes mainly a chassis frame 11, an engine 12, a transmission 13, a front axle 14 and a rear axle 15. In the tractor 1, in addition to a cabin 16 which protects an operator from a rainstorm, a hood 2 which protects the engine 12 from a rainstorm is provided.

The chassis frame 11 constitutes a frame of the tractor 1. The engine 12 and the like explained below are attached to the chassis frame 11.

The engine 12 exchanges heat energy obtained by combustion of fuel into kinetic energy. Namely, the engine 12 generates rotation power by making the fuel burn. The engine 12 is connected to a control device. When an operator operates an accelerator pedal, the control device changes driving state of the engine 12 corresponding to the operation. In the engine 12, an exhaust purification device 12E is provided. The exhaust purification device 12E oxidizes particle (PM), carbon monoxide (CO) and hydrocarbon (HC) contained in exhaust gas.

The transmission 13 transmits the rotation power of the engine 12 to the front axle 14 and the rear axle 15. The rotation power of the engine 12 is inputted to the transmission 13 via a connection mechanism. The transmission 13 has a stepless transmission. When an operator operates a shift lever, operation state of the transmission 13 is changed corresponding to the operation.

The front axle 14 transmits the rotation power of the engine 12 to front wheels 141. The rotation power of the engine 12 is inputted to the front axle 14 via the transmission 13. The front axle 14 is juxtaposed with a steering device. When an operator operates a steering wheel, the steering device changes a steering angle of the front wheels 141 corresponding to the operation.

The rear axle 15 transmits the rotation power of the engine 12 to rear wheels 151. The rotation power of the engine 12 is inputted to the rear axle 15 via the transmission 13. A PTO output device is provided in the rear axle 15. The PTO output device inputs the rotation power to a led work machine when an operator operates a switch.

Next, the hood 2 is explained.

Figure 5:
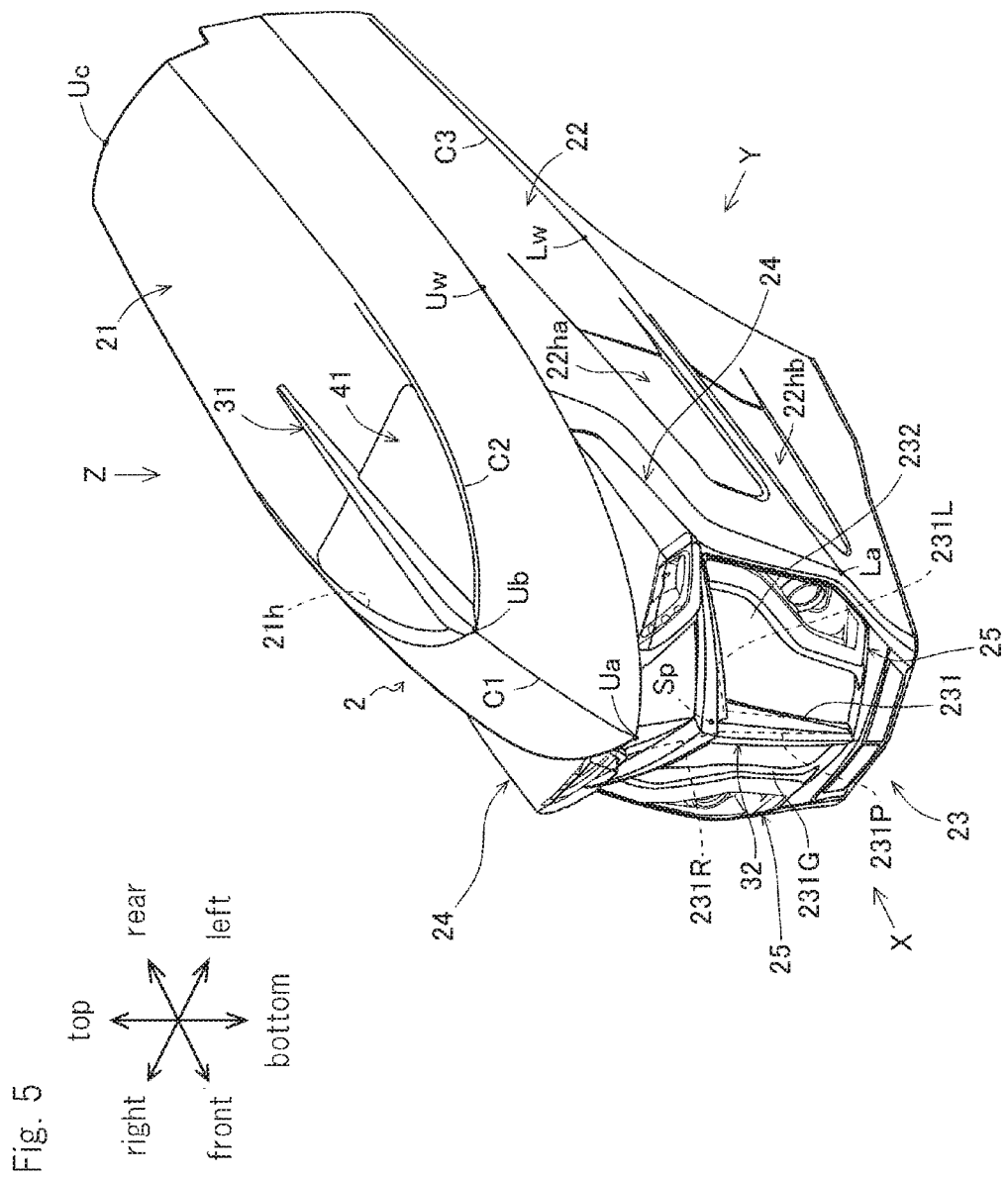
FIG. 5 is a drawing of a hood.
Figure 6:
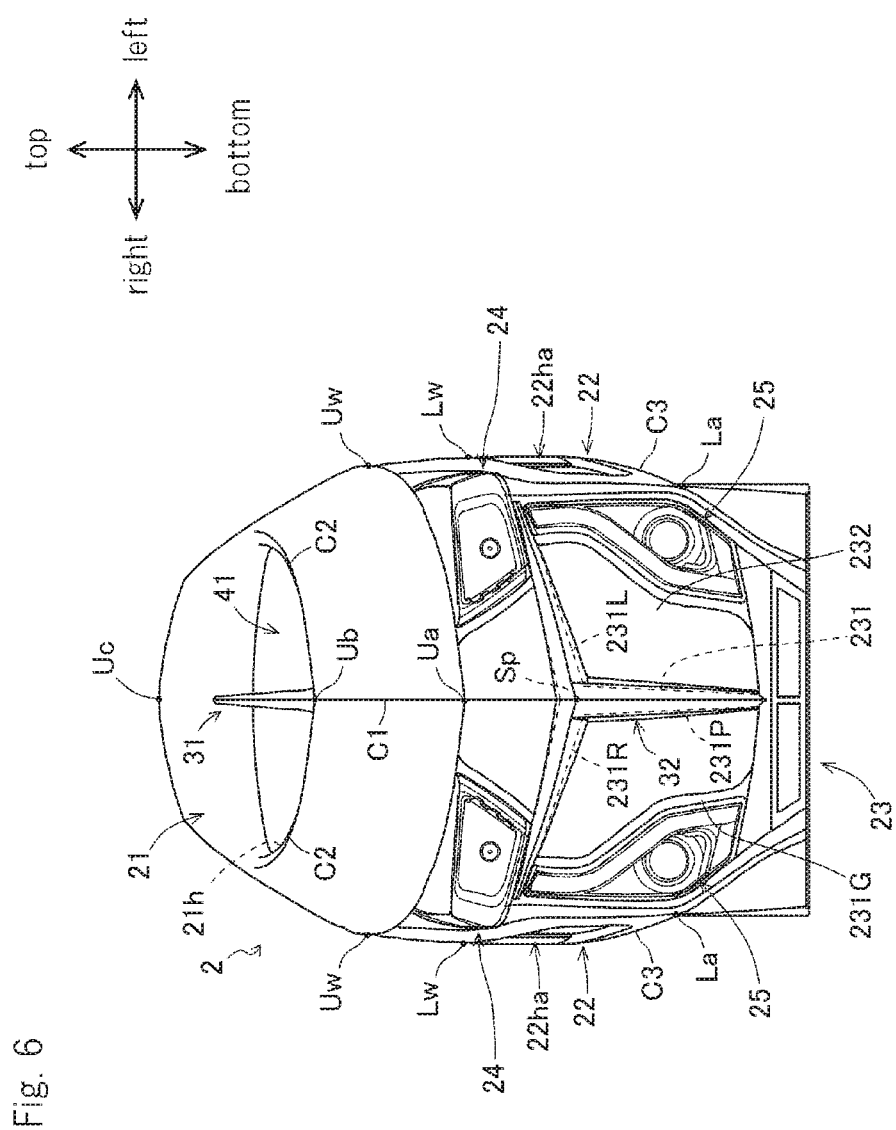
FIG. 6 is a drawing from a direction of an arrow X in FIG. 5.
Figure 7:
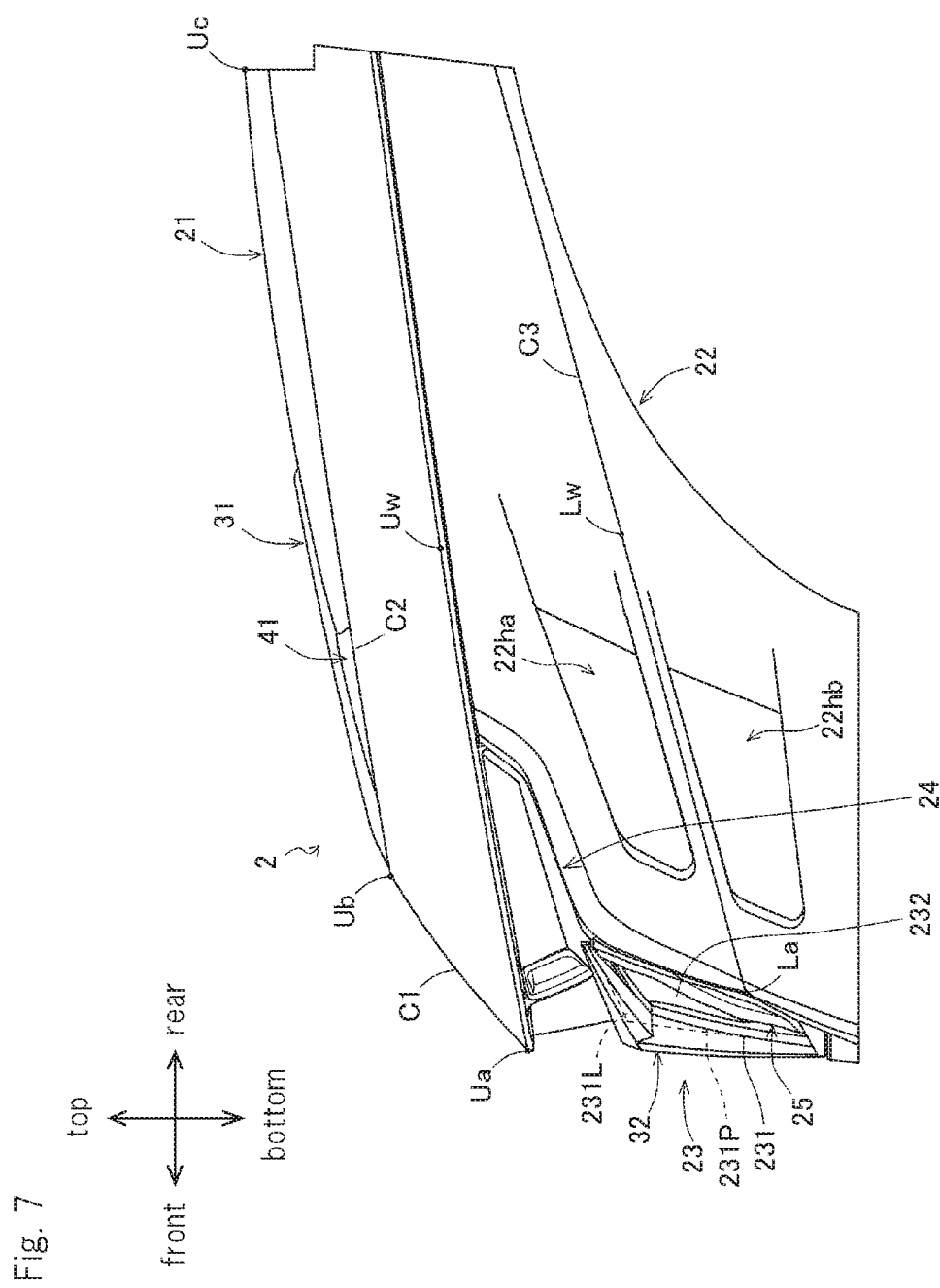
FIG. 7 is a drawing from a direction of an arrow Y in FIG. 5.
Figure 8:
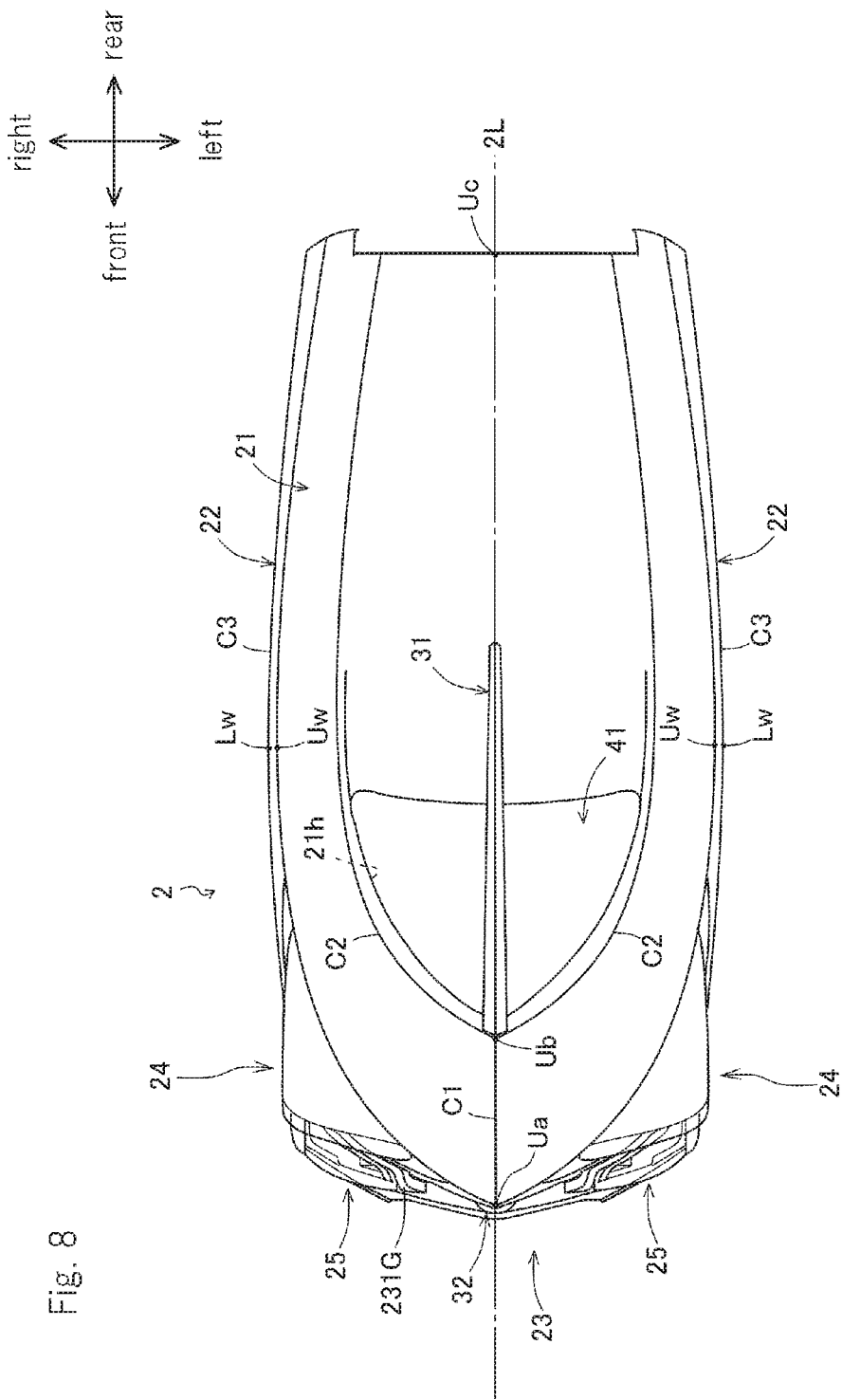
FIG. 8 is a drawing from a direction of an arrow Z in FIG. 5.

FIG. 5 shows the hood 2. FIG. 6 is a drawing from a direction of an arrow X in FIG. 5, and FIG. 7 is a drawing from a direction of an arrow Y in FIG. 5. FIG. 8 is a drawing from a direction of an arrow Z in FIG. 5. In the drawings, the longitudinal, lateral and vertical directions of the tractor 1 are shown.

The hood 2 includes mainly an upper cover 21 and a pair of lower covers 22. In a front surface of the hood 2, a front grill 23 is provided.

The upper cover 21 is an exterior member covering an upper part of the engine 12. The upper cover 21 rises up from a front end point Ua thereof and is bent downward from a middle point Ub. Behind an opening 21$h$, the upper cover 21 curves gradually to a rear end point Uc. Furthermore, the upper cover 21 expands sideward from the front end point Ua and curves gradually so that side end points Uw are maximum width points. In the upper cover 21, a character line C1 is formed from the front end point Ua to the middle point Ub, and character lines C2 are formed from the middle point Ub so as to expand sideward. The opening 21$h$ is formed substantially wedge-like between the two character lines C2. The opening 21$h$ is closed by a design panel 41.

The lower cover 22 is an exterior member covering a side part of the engine 12. The lower cover 22 expands sideward from a front end point La thereof and curves gradually so that side end points Lw are maximum width points. Furthermore, whereas an upper half part of the lower cover 22 is based on a curved surface expanded outward, a lower half part of the lower cover 22 is based on a curved surface depressed inward. In the lower cover 22, character lines C3 which pass from the front end point La through the side end points Lw are formed. Openings 22$ha$ are formed substantially lozenge-like above the character lines C3, and openings 22$hb$ are formed substantially lozenge-like below the character lines C3. An upper front part of the lower cover 22 is formed corresponding to a shape of a high-beam light unit 24. A lower front part of the lower cover 22 is formed corresponding to a shape of a low-beam light unit 25.

The front grill 23 is an exterior member covering a front part of the engine 12. The front grill 23 has a structure in which a metal mesh 232 is stuck on a grill frame 231. The grill frame 231 has beam parts 231L and 231R extended upward aslant from a certain point Sp thereof and a pillar part 231P extended downward from the certain point Sp. The beam parts 231L and 231R and the pillar part 231P become thin gradually as they separate from the certain point Sp, and are connected to a frame part 231G. The metal mesh 232 covers three parts which includes a range surrounded by the beam parts 231L and 231R and the frame part 231G, a range surrounded by the beam part 231L, the pillar part 231P and the frame part 231G, and a range surrounded by the beam part 231R, the pillar part 231P and the frame part 231G. In addition, both sides of an upper part of the front grill 23 are formed corresponding to the shape of the high-beam lamp lens 43 discussed later. Both sides of a lower part of the front grill 23 are formed corresponding to the shape of the low-beam light unit 25.

Furthermore, the hood 2 has below features. A center mark 31 which is substantially I-like shaped is attached to an upper part of the upper cover 21 so as to cross the opening 21$h$ longitudinally. A symbol mark 32 which is substantially Y-like shaped is arranged in a front surface of the front grill 23 so as to cover the beam parts 231L and 231R and the pillar part 231P. Glossy plating is applied to the center mark 31 and the symbol mark 32. Accordingly, an outstanding design is introduced and a strong impression is made on a third person.

Next, the center mark 31 and the design panel 41 are described in detail.

Figure 9:
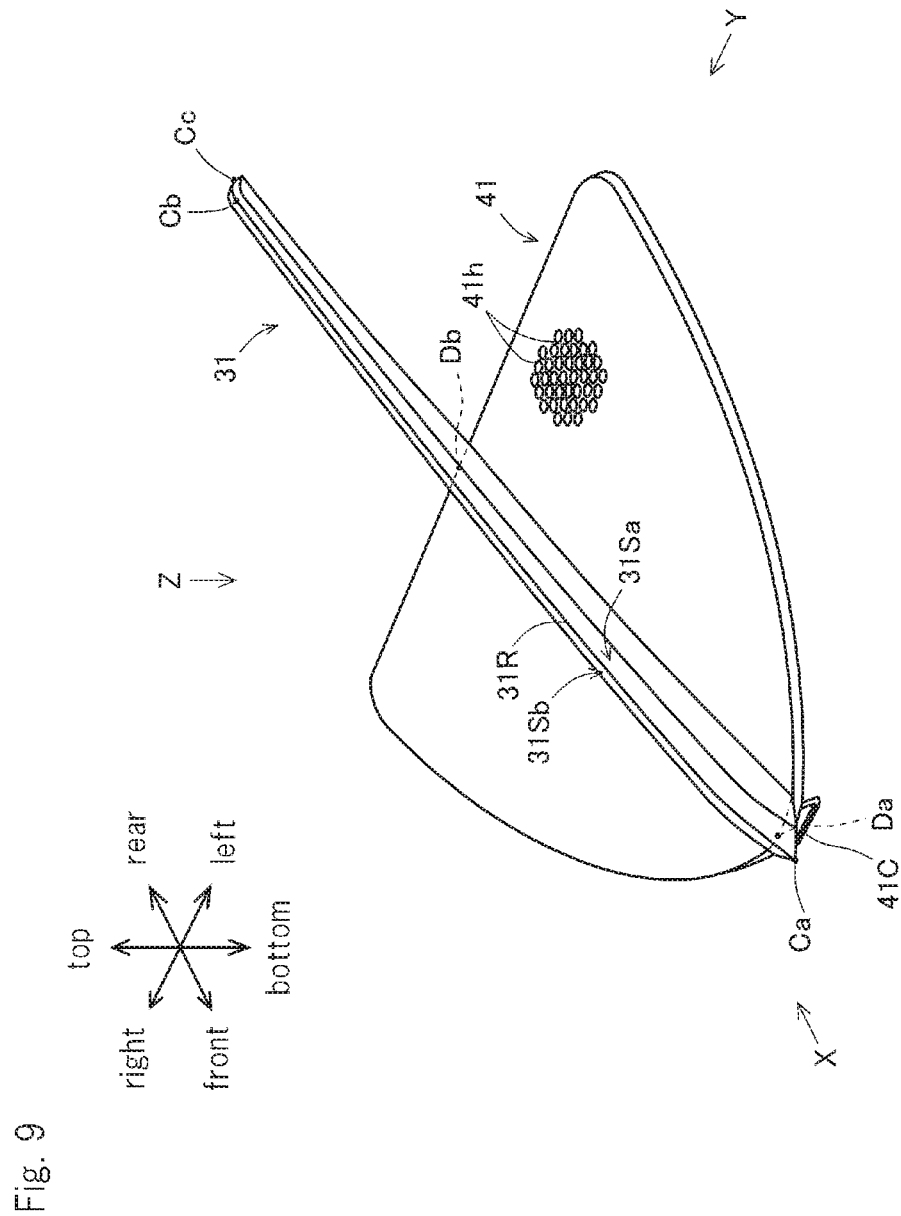
FIG. 9 is a drawing of a center mark and a design panel.
Figure 10:
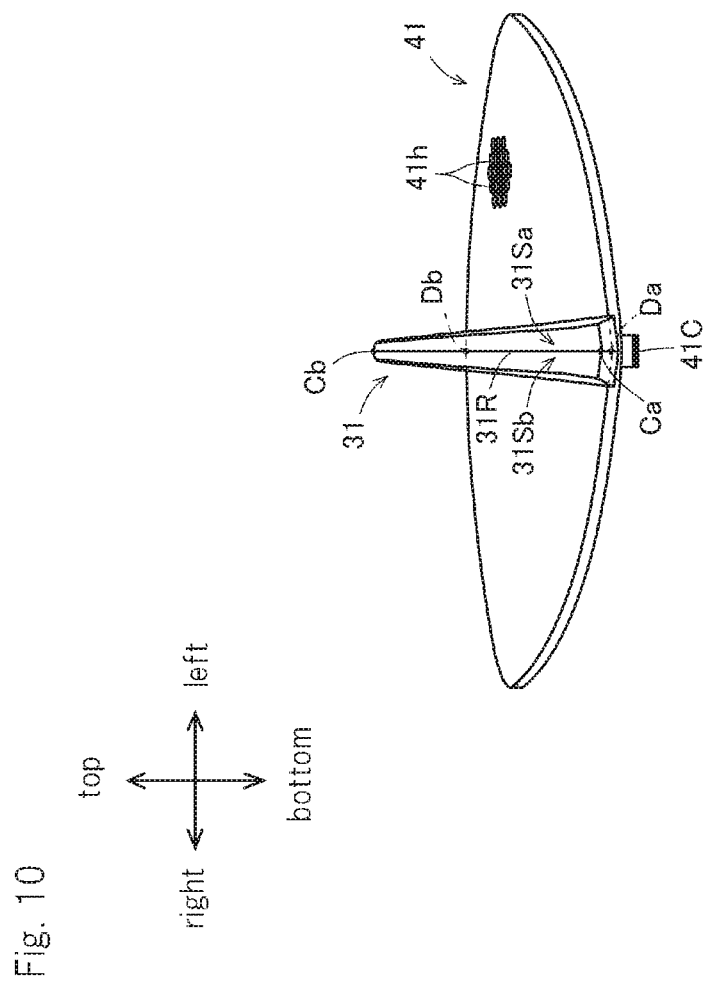
FIG. 10 is a drawing from a direction of an arrow X in FIG. 9.
Figure 11:
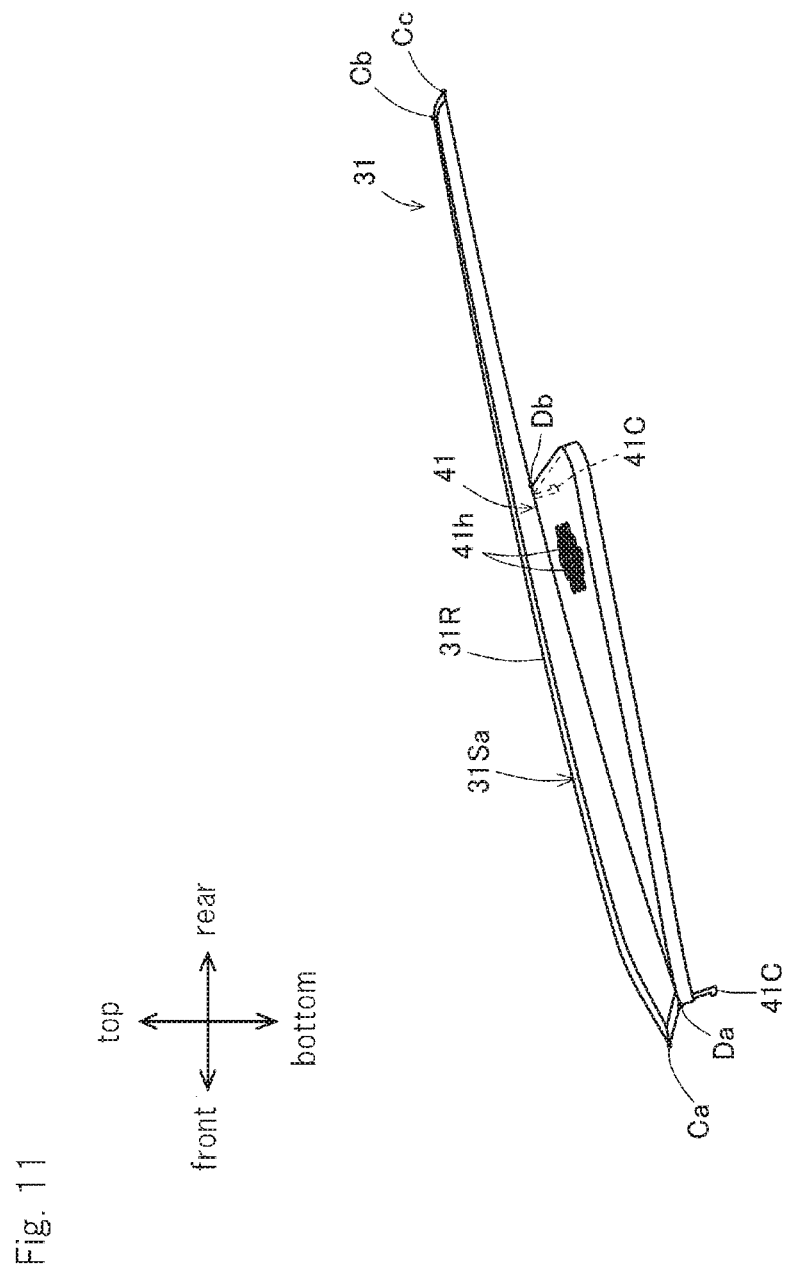
FIG. 11 is a drawing from a direction of an arrow Y in FIG. 9.
Figure 12:
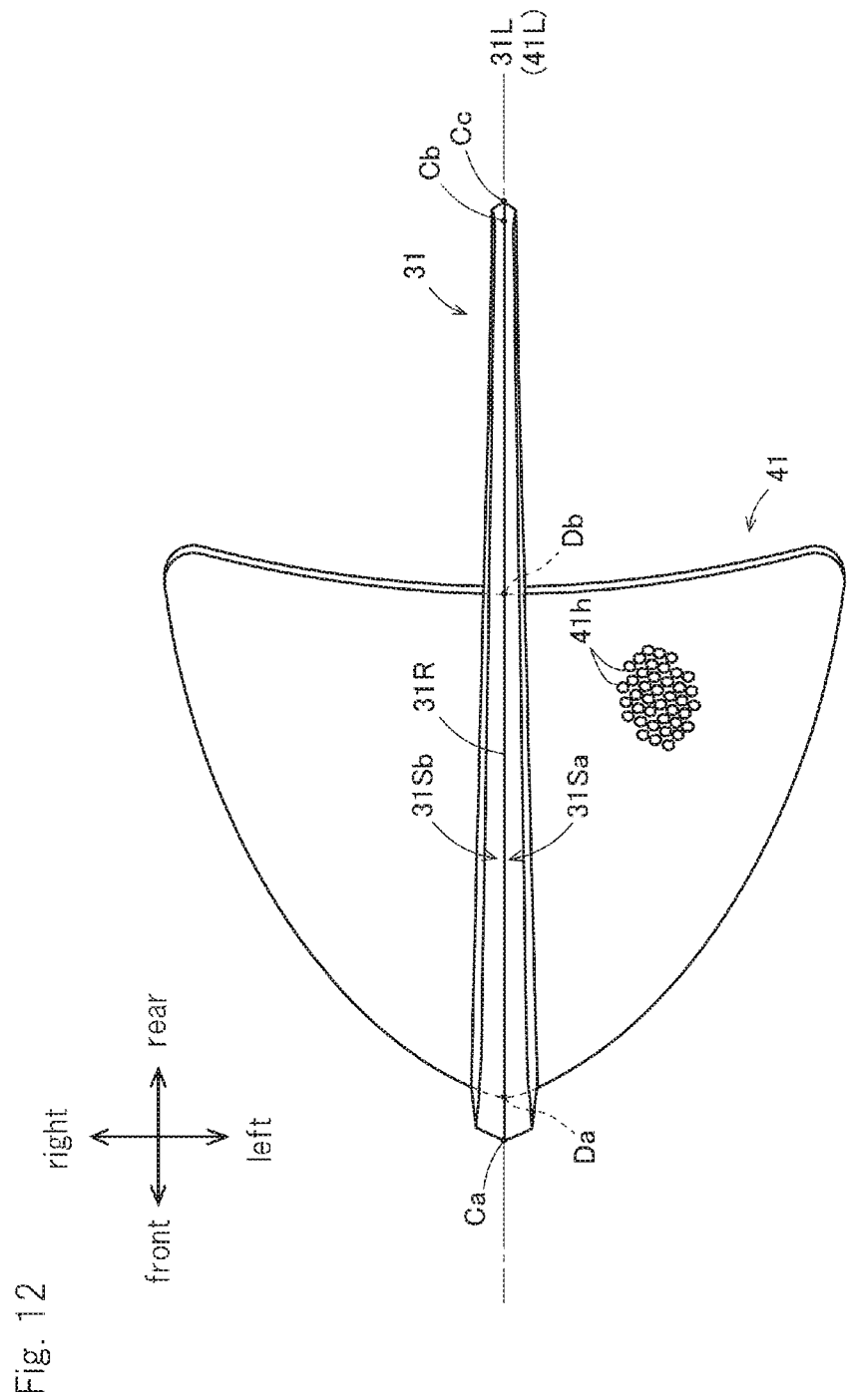
FIG. 12 is a drawing from a direction of an arrow Z in FIG. 9.

FIG. 9 shows the center mark 31 and the design panel 41. FIG. 10 is a drawing from a direction of an arrow X in FIG. 9, and FIG. 11 is a drawing from a direction of an arrow Y in FIG. 9. FIG. 12 is a drawing from a direction of an arrow Z in FIG. 9. In the drawings, the longitudinal, lateral and vertical directions of the tractor 1 are shown.

In the tractor 1, the center mark 31 is fixed to the design panel 41. In detail, the center mark 31 is fixed to the design panel 41 so that a centerline 31L of the center mark 31 overlaps a centerline 41L of the design panel 41 (see FIG. 12). Accordingly, when the design panel 41 is attached to a predetermined position, the center mark 31 overlaps a centerline 2L of the hood 2 (see FIG. 8). As a result, the center mark 31 overlaps a centerline 1L of the tractor 1 (see FIG. 4).

In the tractor 1, the center mark 31 is a metal formed part. The center mark 31 draws a curve which is expanded upward from a front end point Ca thereof and becomes loose gradually to a middle point Cb. Behind the middle point Cb, the center mark 31 draws a circular curve going downward to a rear end point Cc. Namely, a ridgeline 31R from the front end point Ca to the rear end point Cc draws an arc expanded upward. The ridgeline 31R is formed by two curved surfaces 31Sa and 31Sb which go down leftward and rightward from the ridgeline 31R. Accordingly, when viewed from an inside of the cabin 16, the ridgeline 31R is sharpened upward (see FIG. 13).

In the tractor 1, the design panel 41 is a resin formed part. The design panel 41 draws a curve which is expanded upward from a front end point Da thereof and becomes loose gradually to a middle point Db. Furthermore, the design panel 41 has a wedge-like shape which is expanded sideward from the front end point Da thereof. In a back side of the design panel 41, a plurality of hooking claws 41C are provided. Accordingly, the design panel 41 is attached while the hooking claws 41C are hooked on the opening 21h of the upper cover 21. Additionally, in the design panel 41, a plurality of through holes 41h are provided. Accordingly, the design panel 41 permits air to flow from an inside of the hood 2 to the outside or from the outside to the inside thereof (see FIG. 16).

Next, function of the center mark 31 is explained.

Figure 13:
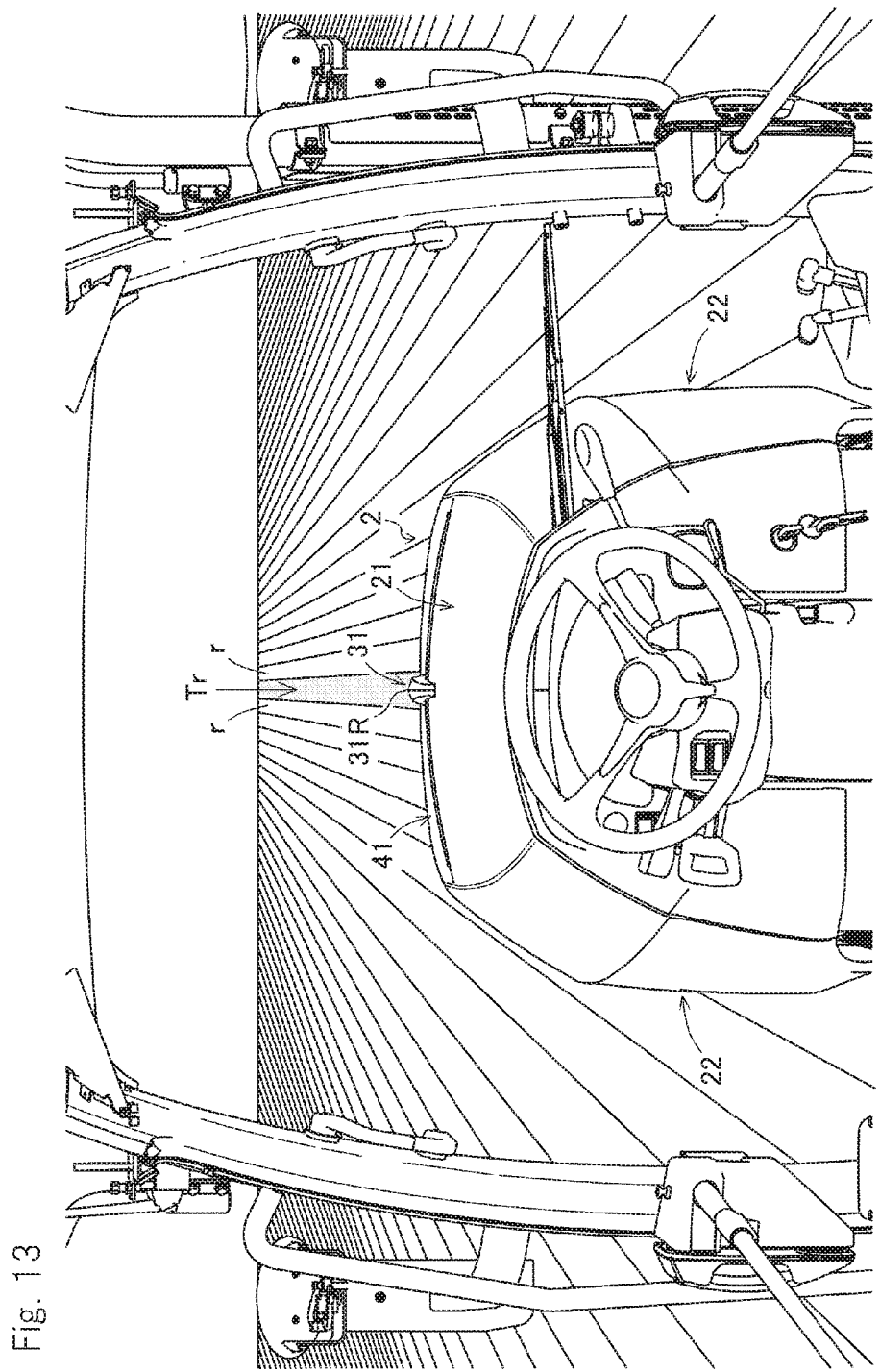
FIG. 13 is a drawing of a visual field of an operator.
Figure 14:
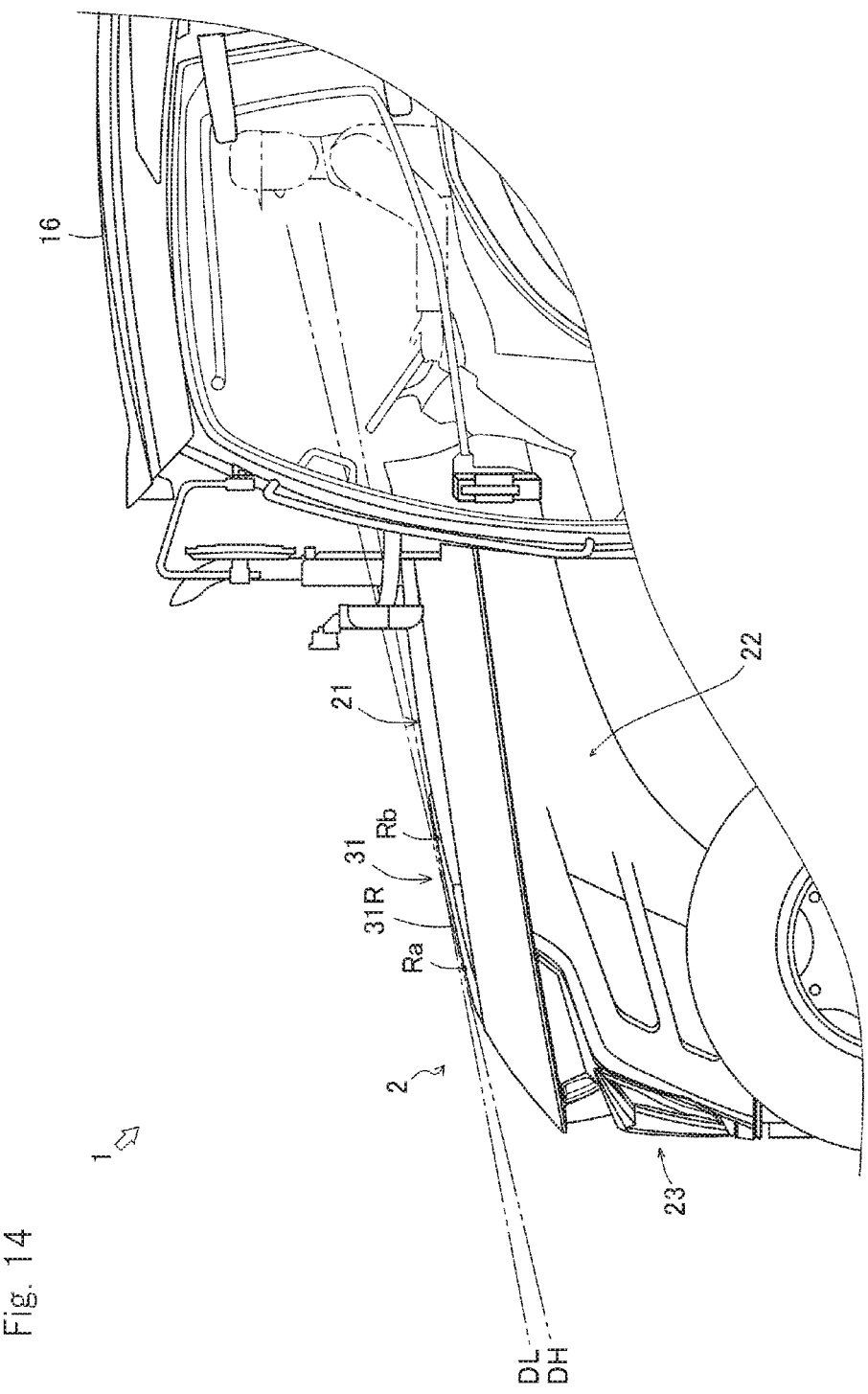
FIG. 14 is a drawing of a visual line of the operator.

FIG. 13 is a drawing of a visual field of an operator. FIG. 14 is a drawing of a visual line of the operator. A two-dot chain line DH shows the visual line of the tall operator, and a two-dot chain line DH shows the visual line of the short operator.

As mentioned above, the center mark 31 is arranged so as to overlap the centerline 1L of the tractor 1. Accordingly, the center mark 31 always shows a travel direction of the tractor 1 to an operator. Therefore, the operator can determines the travel direction by making the center mark 31 overlap a target route Tr. Since the center mark 31 seems to be sharpened upward, the center mark 31 can be made overlap the target route Tr easily even when the target route Tr is narrow. For example, even when the target route Tr is a thin crevice between ridges r, the overlap operation can be performed easily.

When the center mark 31 is taken out of the target route Tr, an operator can recognize that the travel direction is shifted. In this case, the operator can correct the gap of the travel direction by making the center mark 31 overlap the target route Tr again. Since the center mark 31 seems to be sharpened upward, the center mark 31 can be recognized being taken out easily even when the target route Tr is narrow. For example, even when the target route Tr is the thin crevice between the ridges r, the center mark 31 can be recognized being taken out easily.

As the above, the hood 2 according to the present invention has the center mark 31 arranged in the upper part of the upper cover 21. The center mark 31 serves as a sight for an operator to determine the travel direction. Accordingly, the tractor 1 having the hood 2 can determine the travel direction easily and correct the gap of the travel direction suitably. Accordingly, the tractor 1 can be operated easily.

Additionally, in the tractor 1, an operator rides on an extension of the center mark 31. Accordingly, it can be said that the center mark 31 is arranged along the visual line of the operator looking the target route Tr. Therefore, the operator can look the center mark 31 in a natural posture. Since the ridgeline 31R draws an arc expanded upward, the center mark 31 is looked to be sharpened upward even when an angle at which the center mark 31 is looked is different. Concretely, the center mark 31 is looked to be sharpened with a point Ra as a peak by the tall operator, and is looked to be sharpened with a point Rb as the peak by the short operator.

As the above, the center mark 31 is arranged along the visual line of the operator looking the target route Tr. The ridgeline 31R of the center mark 31 draws the arc expanded upward. Accordingly, in the tractor 1 having the hood 2, the target route Tr can be grasped easily on the extension of the center mark 31 regardless of height of the operator.

Next, another function of the center mark 31 is explained.

Figure 15:
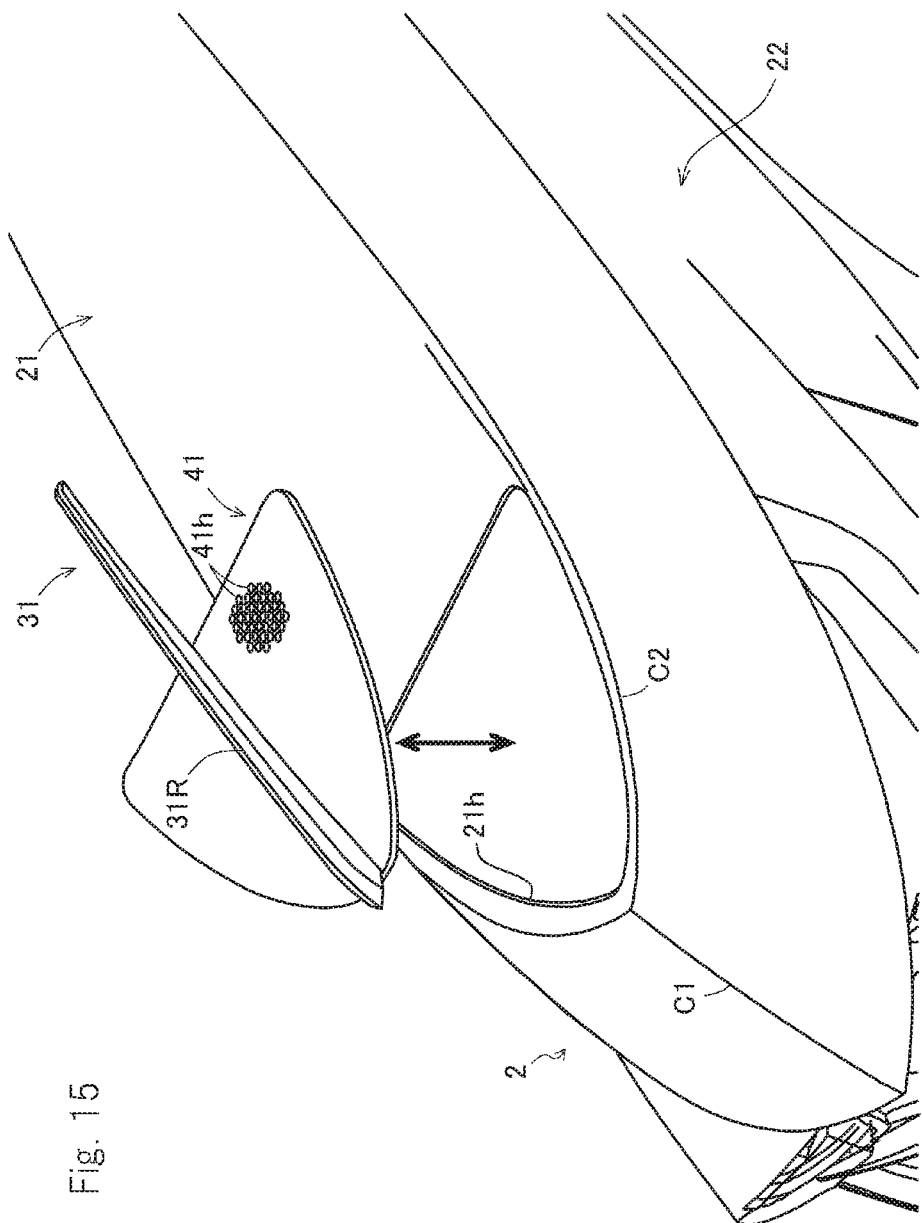
FIG. 15 is a drawing of detachment/attachment work of the design panel.

FIG. 15 shows detachment/attachment work of the design panel 41. The detachment/attachment work means attachment work at the time of production, and detachment work and attachment work at the time of maintenance.

As mentioned above, the center mark 31 is fixed to the design panel 41. The design panel 41 is attached while the hooking claws 41C are hooked on the opening 21h of the upper cover 21. Accordingly, the center mark 31 and the design panel 41 can be detached from/attached to the upper cover 21 integrally. In this case, a worker can perform the detachment/attachment work by grasping the center mark 31.

As the above, the hood 2 according to the present invention has the design panel 41 closing the opening 21h. The center mark 31 is fixed to the design panel 41. Accordingly, in the tractor 1 having the hood 2, since the center mark 31 serves as a handle, the detachment/attachment work of the design panel 41 is easy.

Additionally, in the tractor 1 having the hood 2, since the center mark 31 serves as the handle, work efficiency at the time of the production and the maintenance is improved. When the center mark 31 or the design panel 41 is broken, it can be exchanged easily. Furthermore, when the center mark 31 or the design panel 41 becomes dirty, it can be cleaned easily.

Next, function of the design panel 41 is explained.

Figure 16:
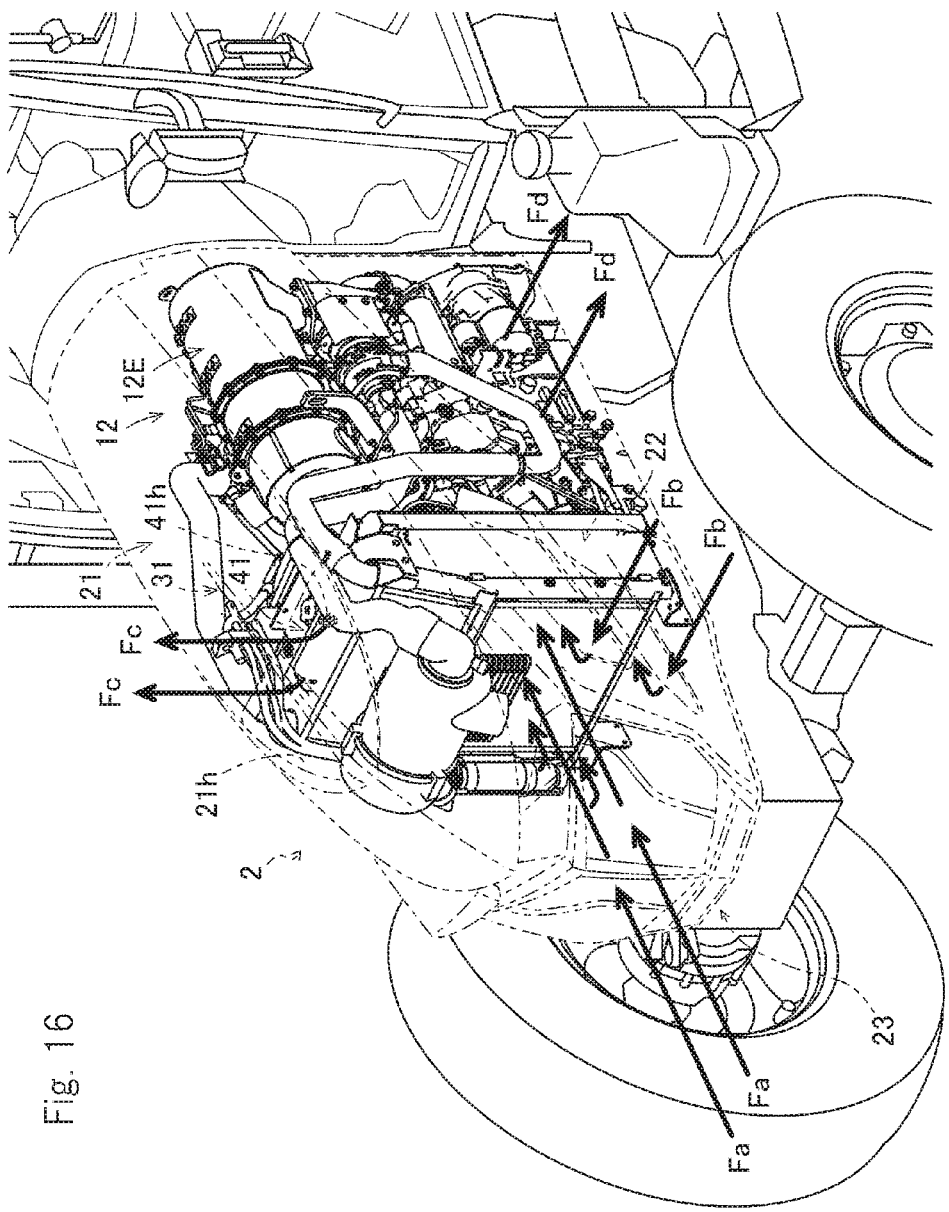
FIG. 16 is a drawing of flow of air in a hood.

FIG. 16 shows flow of air in the hood 2. Arrows Fa and Pb in the drawing shows flow of air supplied to the hood 2, and arrows Fe and Pd in the drawing shows flow of air discharged from the hood 2.

As mentioned above, the plurality of the through holes 41h are provided in the design panel 41. Accordingly, the design panel 41 permits air to flow from the inside of the hood 2 to the outside or from the outside to the inside thereof. In the design panel 41, each of the through holes 41h is a circular hole with a small diameter (a circular hole with a diameter of 2 mm). However, the through hole 41h is not limited thereto and may be a square hole or a triangular hole for example. Number of the through holes 41h may be one or more. Namely, any design panel 41 can be used through which air can flow.

As the above, the one or more through holes 41h are provided in the design panel 41. Accordingly, in the tractor 1 having the hood 2, the design panel 41 serves as a ventilation passage, whereby heat of the engine 12 is hard to be accumulated.

Additionally, in the tractor 1 having the hood 2, since the through holes 41h serve as the ventilation passage, heat balance characteristic of the engine 12 is improved. Accordingly, temperature of lubricating oil is kept proper so as to improve durability of the engine 12. Temperature of fuel is kept proper so as to prevent reduction of output of the engine 12. The design panel 41 is fastidious in design. Accordingly, an outstanding design is introduced and a strong impression is made on a third person.

Below, structure of the hood 2 is explained.

Figure 26:
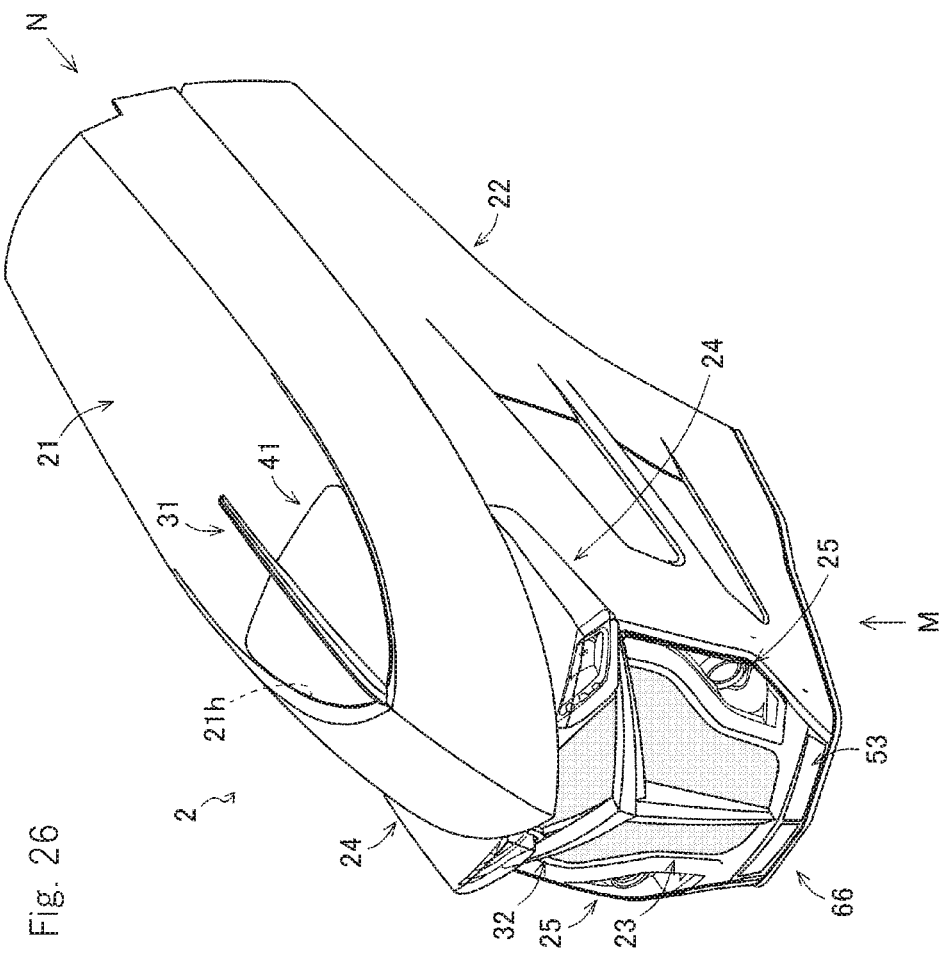
FIG. 26 is a drawing of the state in which the hood is completed.
Figure 27:
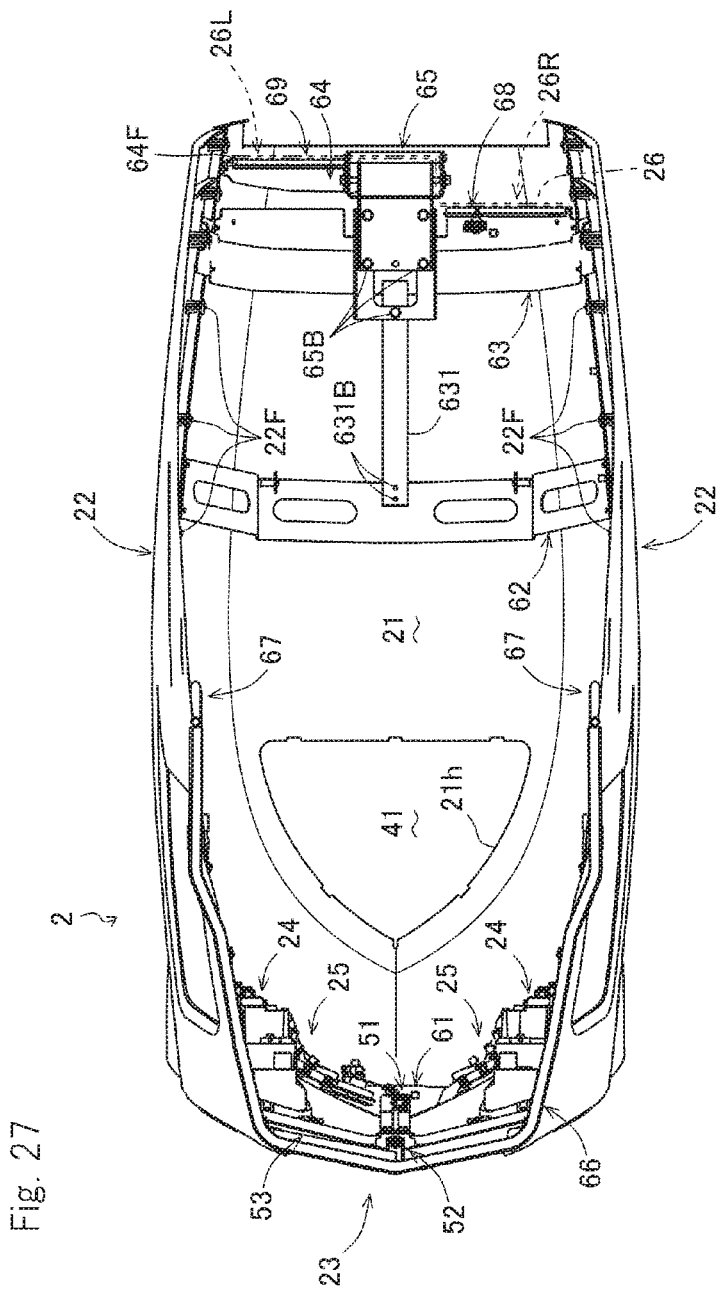
FIG. 27 is a drawing from a direction of an arrow M in FIG. 26.
Figure 28:
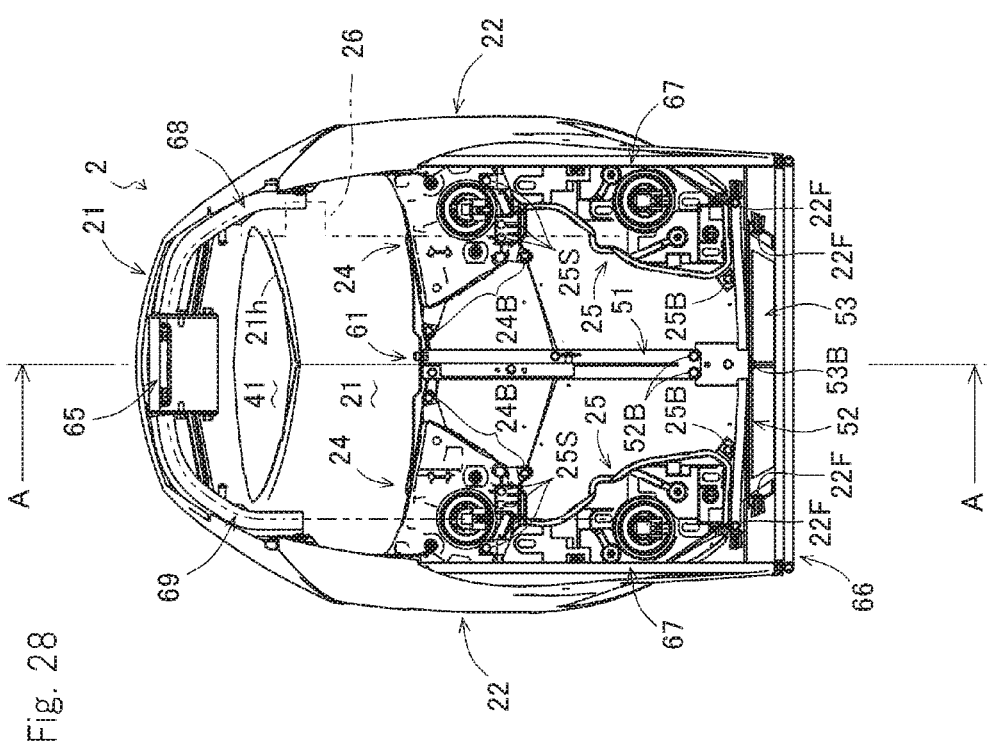
FIG. 28 is a drawing from a direction of an arrow N in FIG. 26.
Figure 29:
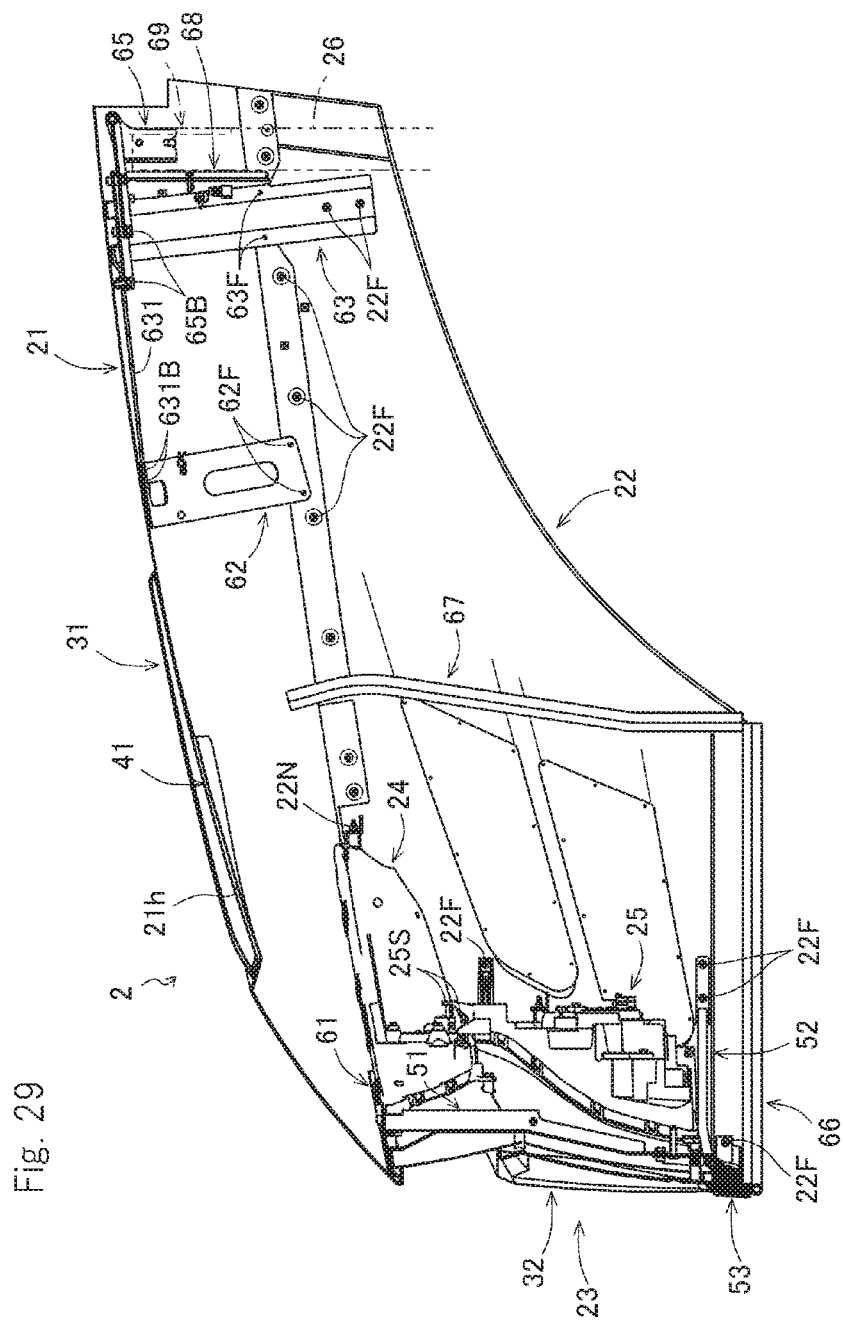
FIG. 29 is an arrow sectional view of the line A-A in FIG. 28.

FIGS. 17 to 25 show assembly processes of the hood 2. FIG. 26 shows the state in which the hood 2 is completed. FIG. 27 is a drawing from a direction of an arrow M in FIG. 26, and FIG. 28 is a drawing from a direction of an arrow N in FIG. 26. Furthermore, FIG. 29 is an arrow sectional view of the line A-A in FIG. 28. Herein, only main processes are explained. The order of the processes is not limited.

Figure 17:
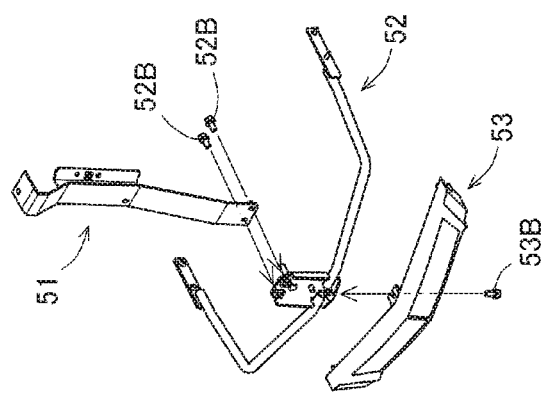
FIG. 17 is a drawing of an assembly process of the hood.

In a first process, a side frame 52 and an under spacer 53 are attached to a center pillar 51 (see FIG. 17). In detail, in the process, the side frame 52 is attached to the center pillar 51, and the under spacer 53 is attached to the side frame 52. The side frame 52 is fixed to a lower end of the center pillar 51 by bolts 52B. The under spacer 53 is fixed to a lower surface of the side frame 52 by a bolt 53B.

Figure 18:
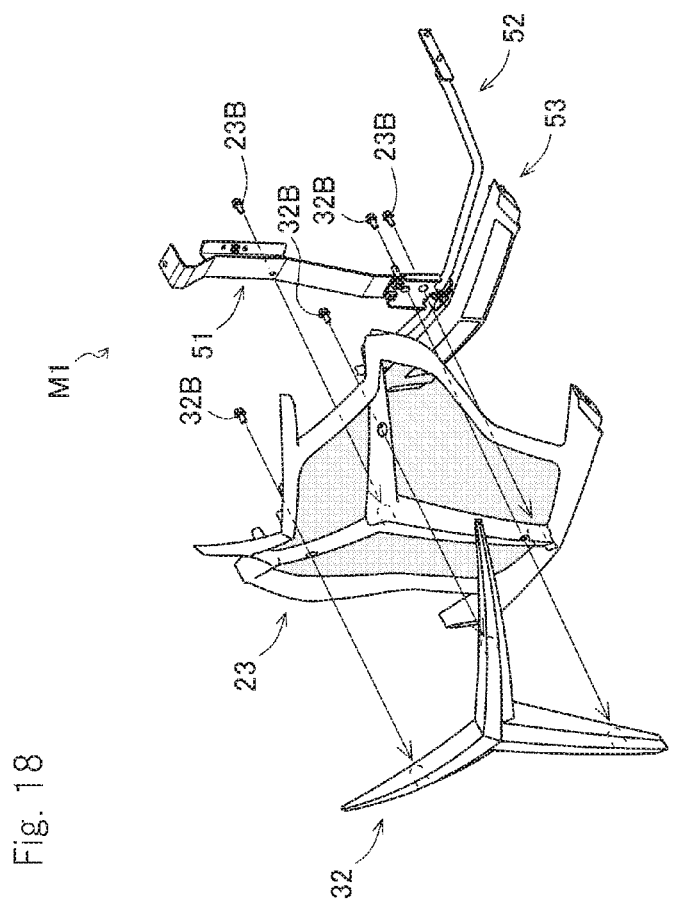
FIG. 18 is a drawing of an assembly process of the hood.

In a second process, the front grill 23 and the symbol mark 32 are attached to a module M1 assembled in the first process (see FIG. 18). In detail, in the process, the front grill 23 is attached to the center pillar 51, and the symbol mark 32 is attached to the front grill 23. The front grill 23 is fixed to a front surface of the center pillar 51 by bolts 23B. The symbol mark 32 is fixed to a front surface of the front grill 23 by bolts 32B.

Figure 19:
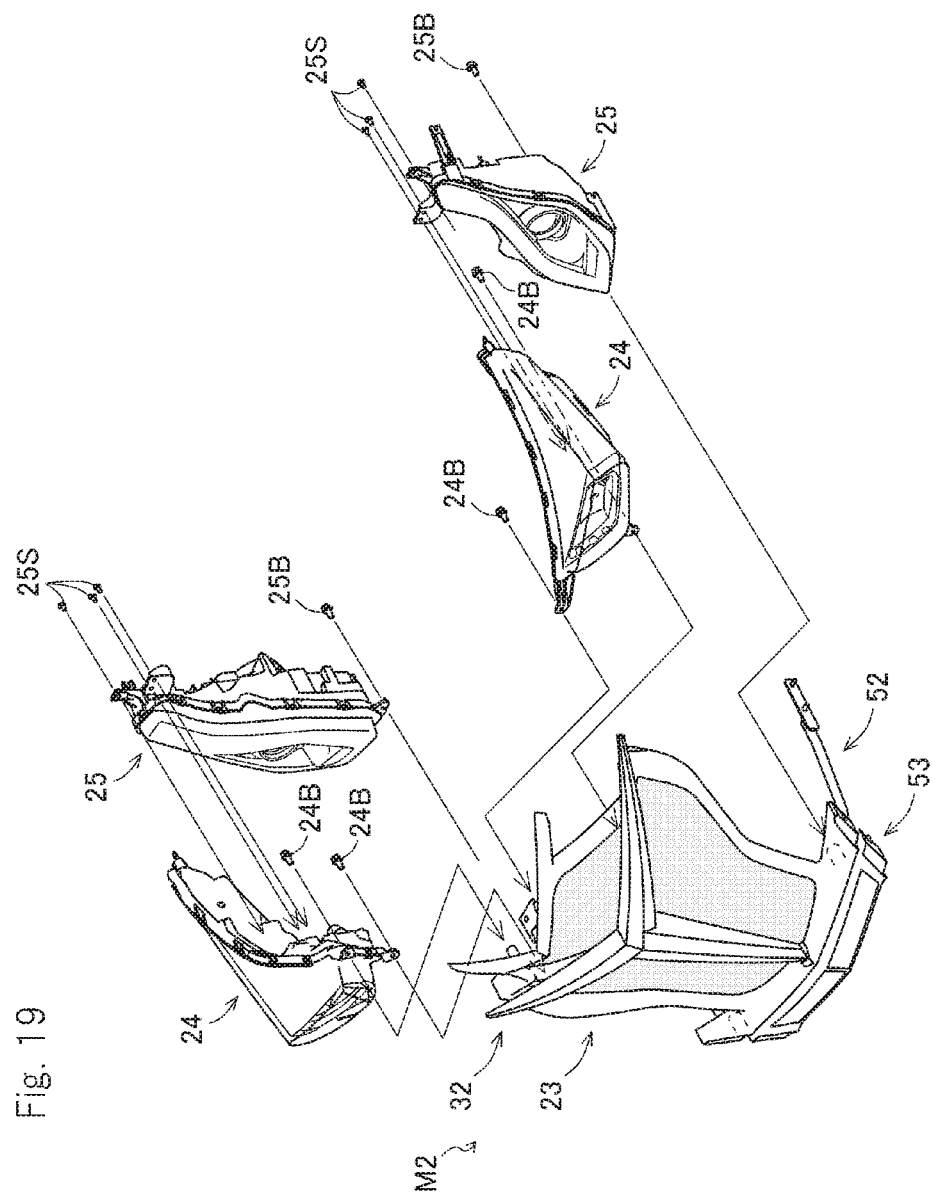
FIG. 19 is a drawing of an assembly process of the hood.

In a third process, the high-beam light unit 24 and the low-beam light unit 25 are attached to a module M2 assembled in the second process (see FIG. 19). In detail, in the process, the high-beam light unit 24 is attached to the front grill 23, and the low-beam light unit 25 is attached to the front grill 23. The high-beam light unit 24 is fixed to a reverse side surface of the front grill 23 by bolts 24B. The low-beam light unit 25 is fixed to the reverse side surface of the front grill 23 by a bolt 25B. The low-beam light unit 25 is fixed to a rear surface of the high-beam light unit 24 by screws 25S.

Figure 20:
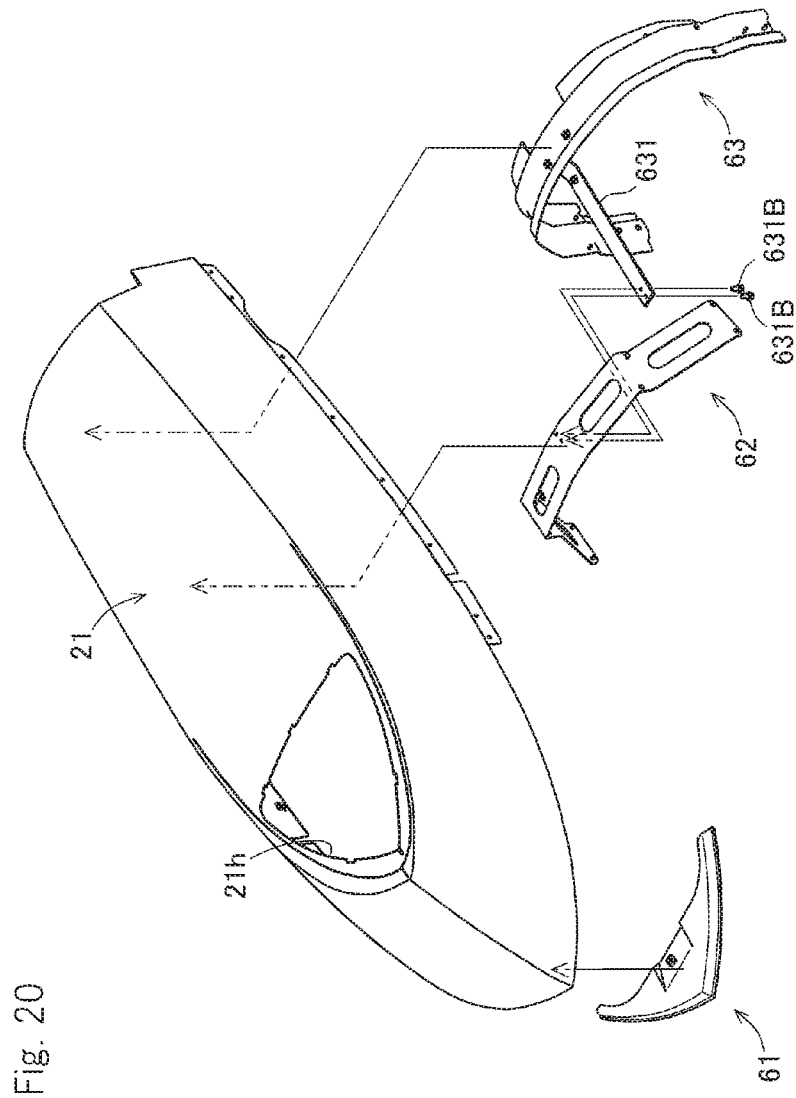
FIG. 20 is a drawing of an assembly process of the hood.

In a fourth process, a tip member 61, a middle member 62 and an end member 63 are attached to the upper cover 21 (see FIG. 20). In detail, in the process, the tip member 61 is attached to the upper cover 21, the middle member 62 is attached to the upper cover 21, and the end member 63 is attached to the upper cover 21. The tip member 61 is fixed to a reverse side surface of a tip part of the upper cover 21 by an adhesive. The middle member 62 is fixed to a reverse side surface of a middle part of the upper cover 21 by an adhesive and fasteners 62F (see FIG. 29). The end member 63 is fixed to a reverse side surface of a rear end part of the upper cover 21 by an adhesive and fasteners 63F (see FIG. 29). A center beam 631 is welded previously to the end member 63. The center beam 631 is fixed to a lower surface of the middle member 62 by bolts 631B.

Figure 21:
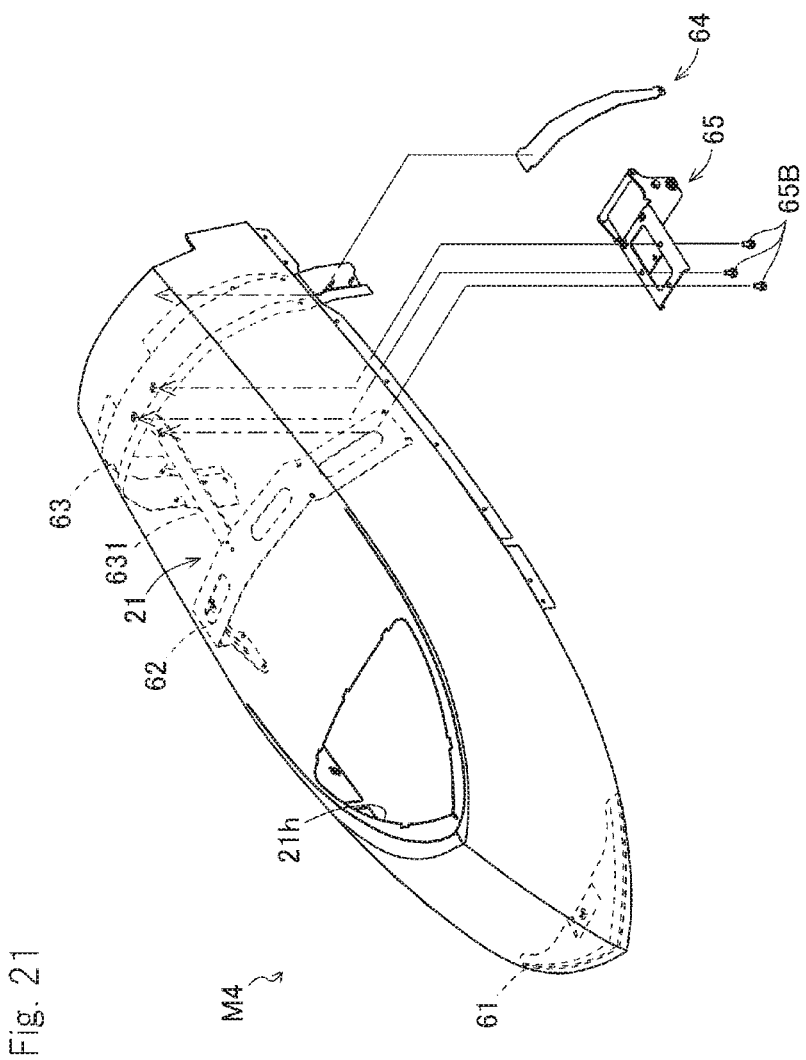
FIG. 21 is a drawing of an assembly process of the hood.

In a fifth process, a support plate 64 and a hood hinge 6S are attached to a module M4 assembled in the fourth process (see FIG. 21). In detail, in the process, the support plate 64 is attached to the upper cover 21, and the hood hinge 6S is attached to the end member 63. The support plate 64 is fixed to the reverse side surface of the rear end part of the upper cover 21 by an adhesive and a fastener 64F (see FIG. 27). The hood hinge 6S is fixed to a lower surface of the end member 63 by bolts 6SB. The hood hinge 6S is fixed to a lower surface of the center beam 631 by the bolts 6SB.

Figure 22:
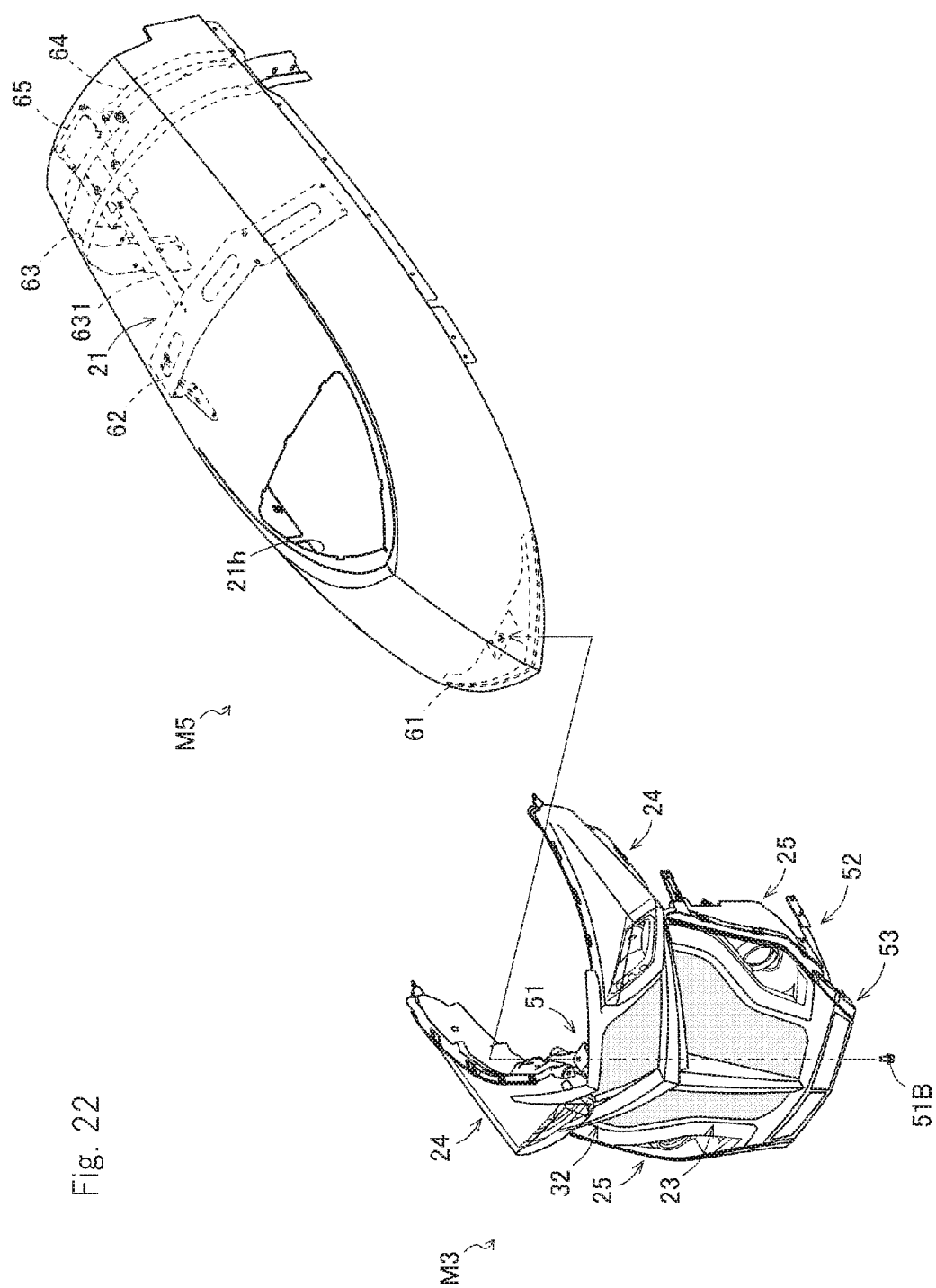
FIG. 22 is a drawing of an assembly process of the hood.

In a sixth process, a module M3 assembled in the third process is combined with a module MS assembled in the fifth process (see FIG. 22). In detail, in the process, the center pillar S1 constituting the module M3 is connected to the tip member 61 constituting the module MS so as to configure one module M6. The center pillar S1 is connected to the tip member 61 by a bolt S1B.

Figure 23:
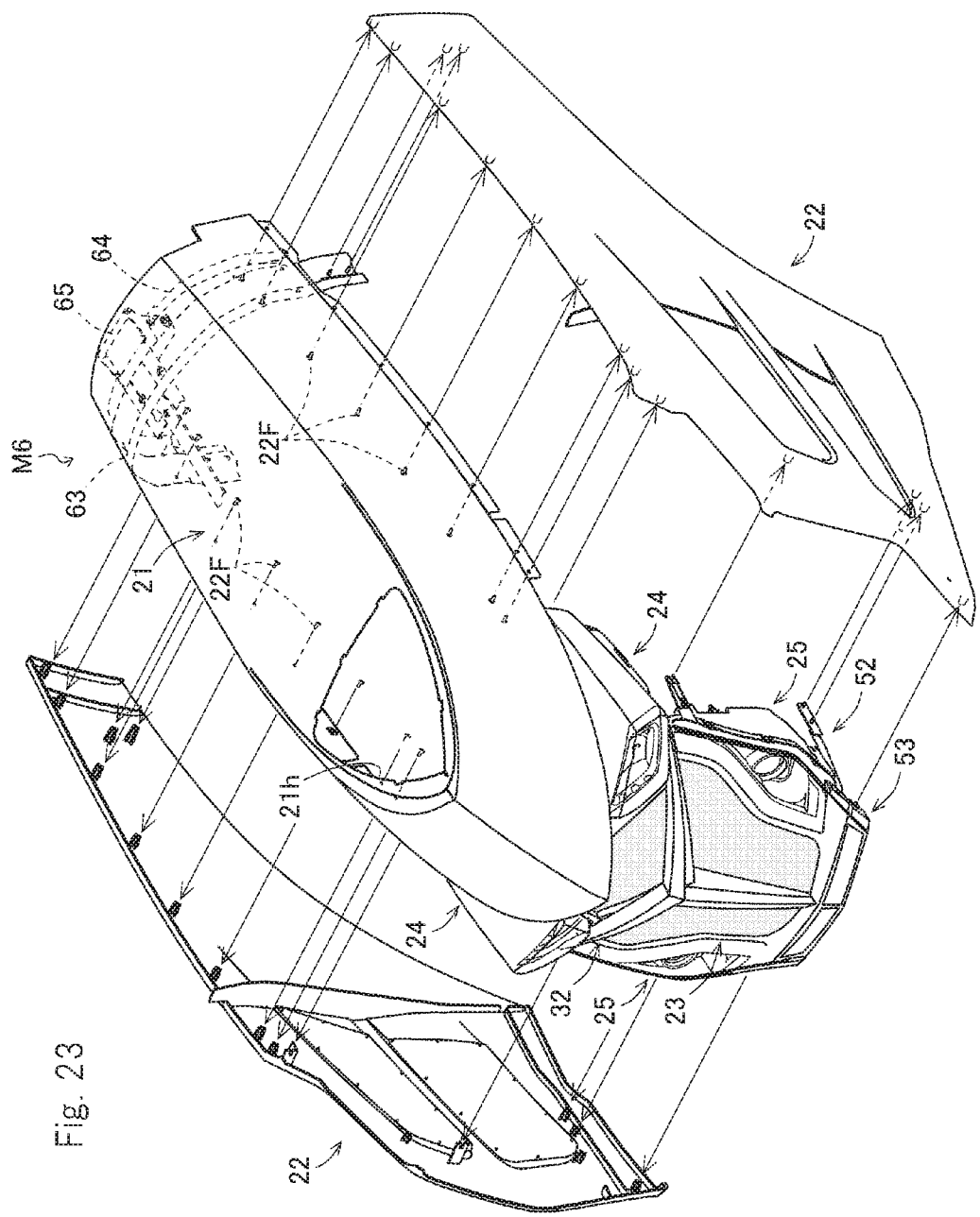
FIG. 23 is a drawing of an assembly process of the hood.

In a seventh process, the lower cover 22 is attached to the module M6 assembled in the sixth process (see FIG. 23). In detail, in the process, the lower cover 22 is attached to the upper cover 21, the side frame S2, the end member 63 and the like. The lower cover 22 is fixed to the upper cover 21, the side frame S2 and the end member 63 by fasteners 22F. The lower cover 22 is fixed to the high-beam light unit 24 by a nut 22N (see FIG. 29). The lower cover 22 is fixed to the low-beam light unit 2S by the fasteners 22F (see FIG. 29). Furthermore, the lower cover 22 is fixed to the under spacer 53 by the fasteners 22F (see FIGS. 28 and 29).

Figure 24:
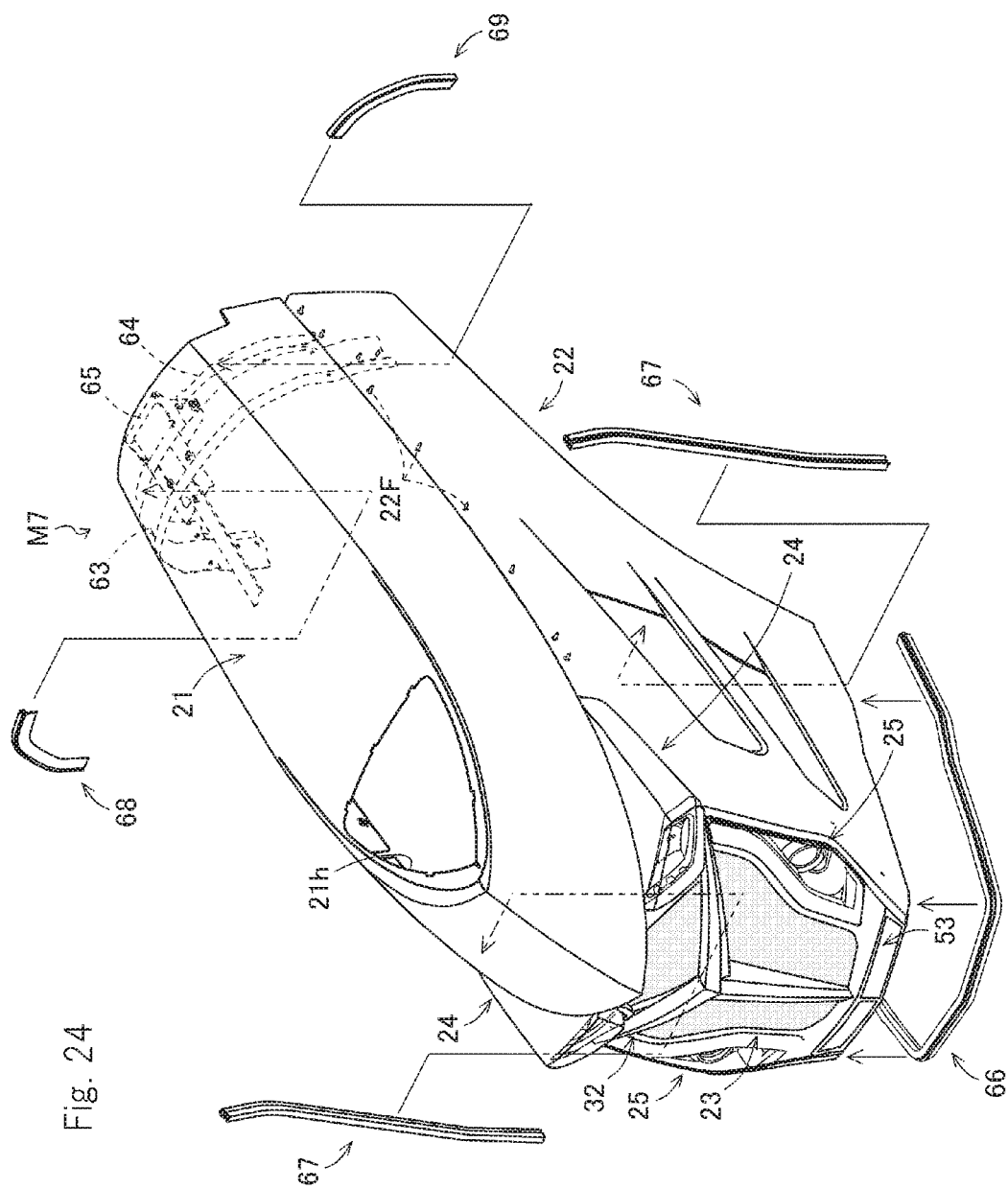
FIG. 24 is a drawing of an assembly process of the hood.

In an eighth process, weather strips 66, 67, 68 and 69 are attached to a module M7 assembled in the seventh process (see FIG. 24). In detail, in the process, the weather strips 66, 67, 68 and 69 are attached to the under spacer 53, the lower cover 22, the end member 63 and the like. The weather strip 66 is engaged with lower sides of the under spacer 53 and the lower cover 22. The weather strip 67 is engaged with a rib in an inner side of the lower cover 22. Furthermore, the weather strip 68 is engaged with a rear side of the end member 63 (only on the right of the hood hinge 65). The weather strip 69 is engaged with a rear side of the support plate 64 (only on the left of the hood hinge 65).

Figure 25:
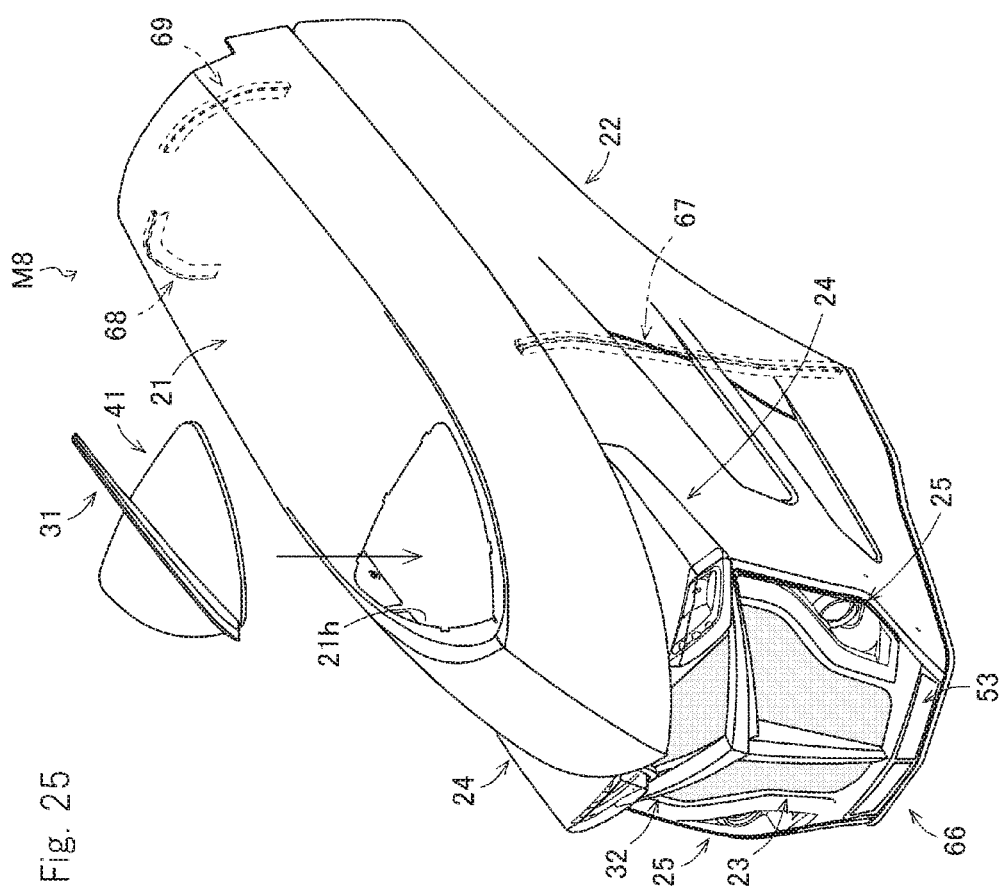
FIG. 25 is a drawing of an assembly process of the hood.

In a ninth process, the design panel 41 is attached to a module M8 assembled in the eighth process (see FIG. 25). In detail, in the process, the design panel 41 is attached to the opening 21h of the upper cover 21. As mentioned above, the design panel 41 is attached while the hooking claws 41C are hooked on the opening 21h of the upper cover 21. The center mark 31 is fixed previously to the design panel 41.

As the above, the hood 2 is completed (see FIGS. 26, 27, 28 and 29).

Next, features in the structure of the hood 2 are described.

As a first feature, the hood 2 has the center pillar 51. The center pillar 51 serves as an attachment standard of the members or the group of the members (in the above, referred to as "modules") constituting the hood 2. The side frame 52 and the like explained below are attached to the center pillar 51 directly or indirectly.

As a second feature, the side frame 52 is attached to the center pillar 51 (see FIG. 17). Namely, the side frame 52 is attached directly to the center pillar 51 which is the attachment standard.

As the above, the hood 2 according to the present invention has the side frame 52. The side frame 52 is attached to the center pillar 51. Accordingly, in the hood 2, an attachment position of the side frame 52 to the center pillar 51 is hard to be shifted, whereby assembly accuracy is improved.

As a third feature, the under spacer 53 is attached to the side frame 52 (see FIG. 17). In detail, in the hood 2, the side frame 52 is attached to the center pillar 51 which is the attachment standard. The under spacer 53 is attached to the side frame 52. Namely, the under spacer 53 is attached indirectly to the center pillar 51 which is the attachment standard.

As the above, the hood 2 according to the present invention has the under spacer 53. The under spacer 53 is attached to the side frame 52. Accordingly, in the hood 2, an attachment position of the under spacer 53 to the side frame 52 is hard to be shifted, whereby assembly accuracy is improved. As a result, the attachment position of the under spacer 53 to the center pillar 51 is hard to be shifted, whereby assembly accuracy is improved. The under spacer 53 may alternatively be attached directly to the center pillar 51. In this case, similar effect is obtained.

As a fourth feature, the front grill 23 is attached to the center pillar 51 (see FIG. 18). Namely, the front grill 23 is attached directly to the center pillar 51 which is the attachment standard.

As the above, the hood 2 according to the present invention has the front grill 23. The front grill 23 is attached to the center pillar 51. Accordingly, in the hood 2, the attachment position of the front grill 23 to the center pillar 51 is hard to be shifted, whereby assembly accuracy is improved.

As a fifth feature, the high-beam light unit 24 and the low-beam light unit 25 are attached to the front grill 23 (see FIG. 19). In detail, in the hood 2, the front grill 23 is attached to the center pillar 51 which is the attachment standard. The high-beam light unit 24 and the low-beam light unit 25 are attached to the front grill 23. Namely, the high-beam light unit 24 and the low-beam light unit 25 are attached indirectly to the center pillar 51 which is the attachment standard.

As the above, the hood 2 according to the present invention has the light units (the high-beam light unit 24 and the low-beam light unit 25). The light units (24 and 25) are attached to the front grill 23. Accordingly, in the hood 2, the attachment position of the light units (24 and 25) to the front grill 23 is hard to be shifted, whereby assembly accuracy is improved. As a result, the attachment position of the light units (24 and 25) to the center pillar 51 is hard to be shifted, whereby assembly accuracy is improved. The light units (24 and 25) may alternatively be attached directly to the center pillar 51. In this case, similar effect is obtained.

As a sixth feature, the upper cover 21 is supported by the center pillar 51 (see FIG. 22). Namely, the upper cover 21 is supported directly by the center pillar 51 which is the attachment standard.

As the above, the hood 2 according to the present invention has the upper cover 21. The upper cover 21 is supported by the center pillar 51. Accordingly, in the hood 2, the attachment position of the upper cover 21 to the center pillar 51 is hard to be shifted, whereby assembly accuracy is improved.

As a seventh feature, the lower cover 22 is attached to at least the upper cover 21 and the side frame 52 (see FIG. 23). In detail, in the hood 2, the upper cover 21 is supported by the center pillar 51 which is the attachment standard. The side frame 52 is attached to the center pillar 51 which is the attachment standard. The lower cover 22 is attached to at least the upper cover 21 and the side frame 52. Namely, the lower cover 22 is attached indirectly to the center pillar 51 which is the attachment standard.

As the above, the hood 2 according to the present invention has the lower cover 22. The lower cover 22 is attached to at least the upper cover 21 and the side frame 52. Accordingly, in the hood 2, the attachment position of the lower cover 22 to the upper cover 21 and the side frame 52 is hard to be shifted, whereby assembly accuracy is improved. As a result, the attachment position of the lower cover 22 to the center pillar 51 is hard to be shifted, whereby assembly accuracy is improved. In the hood 2, the lower cover 22 is also attached to the light units (24 and 25) and the under spacer 53. Accordingly, rigidity of the lower cover 22 is improved.

A structure making the hood 2 openable/closable is explained below.

Figure 30:
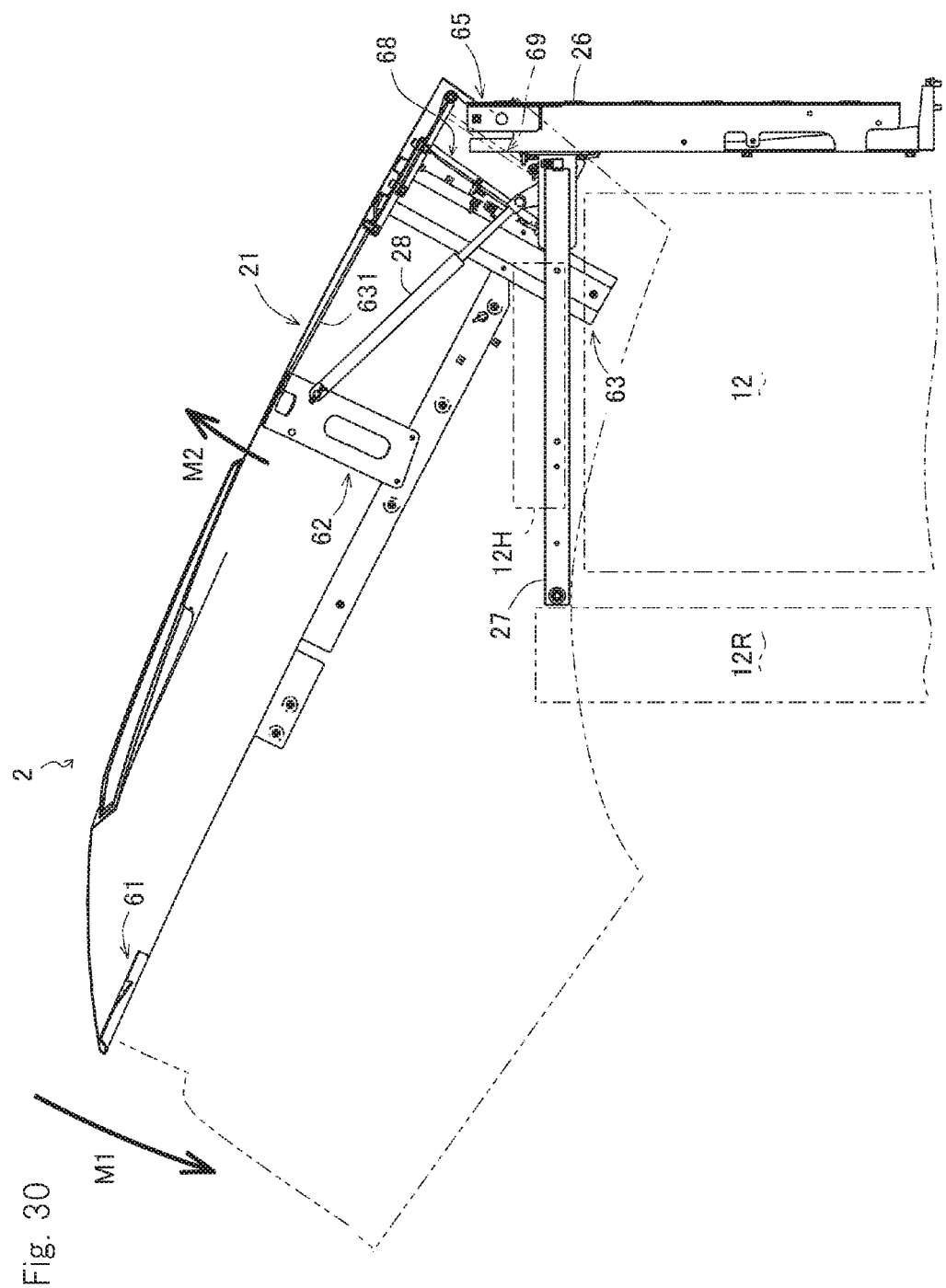
FIG. 30 is a drawing of the state in which the hood is opened.
Figure 31:
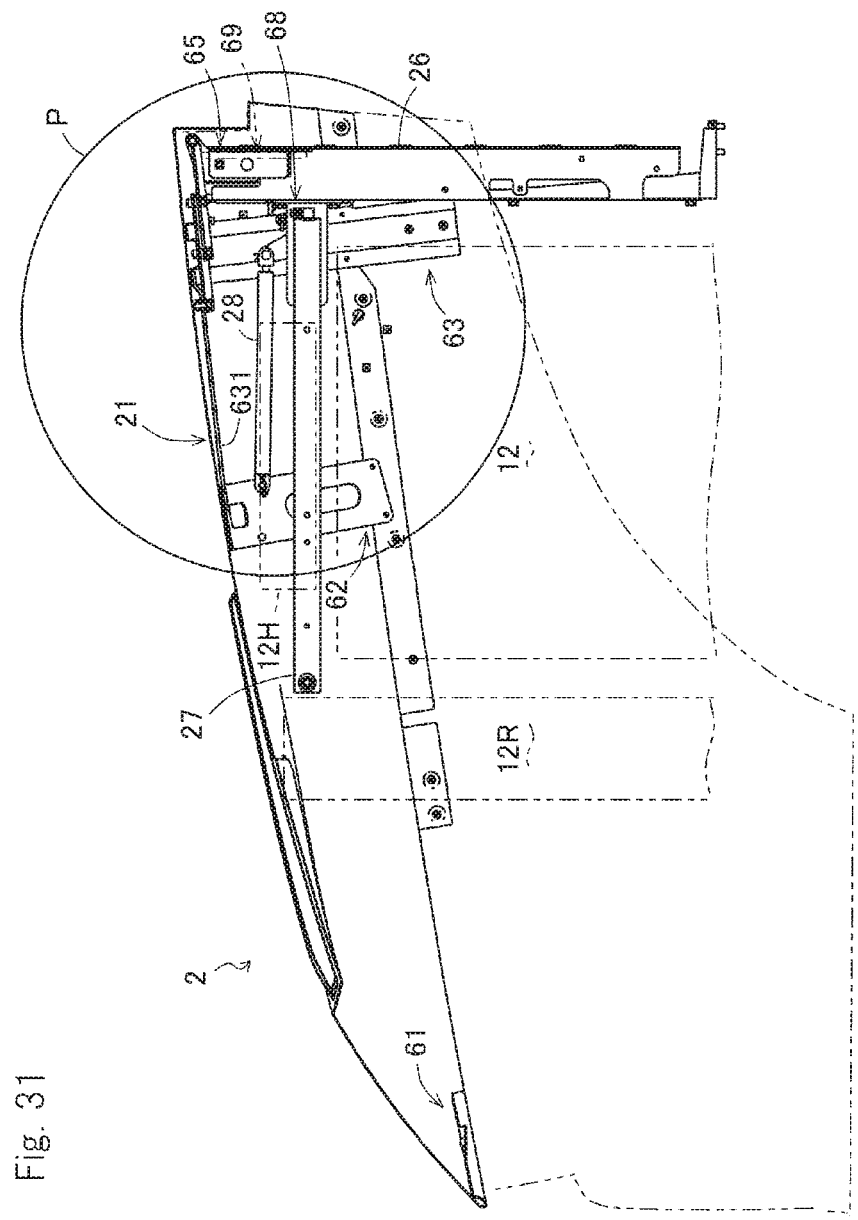
FIG. 31 is a drawing of the state in which the hood is closed.
Figure 32:
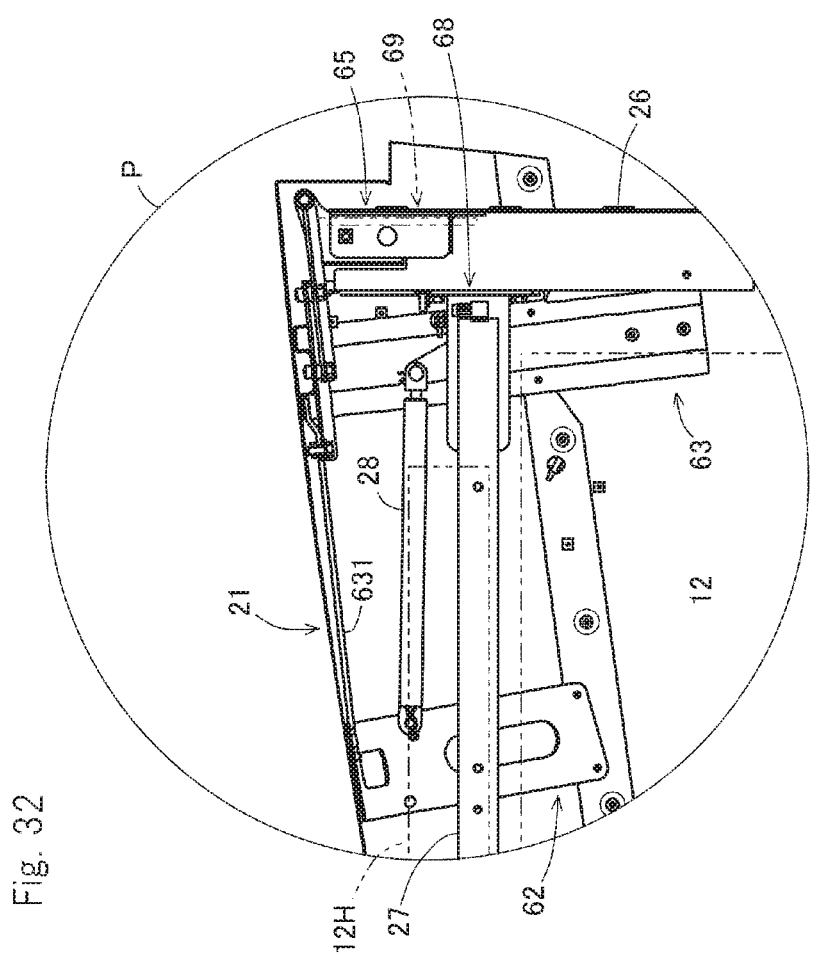
FIG. 32 is a drawing in which an area P in FIG. 31 is expanded.
Figure 33:
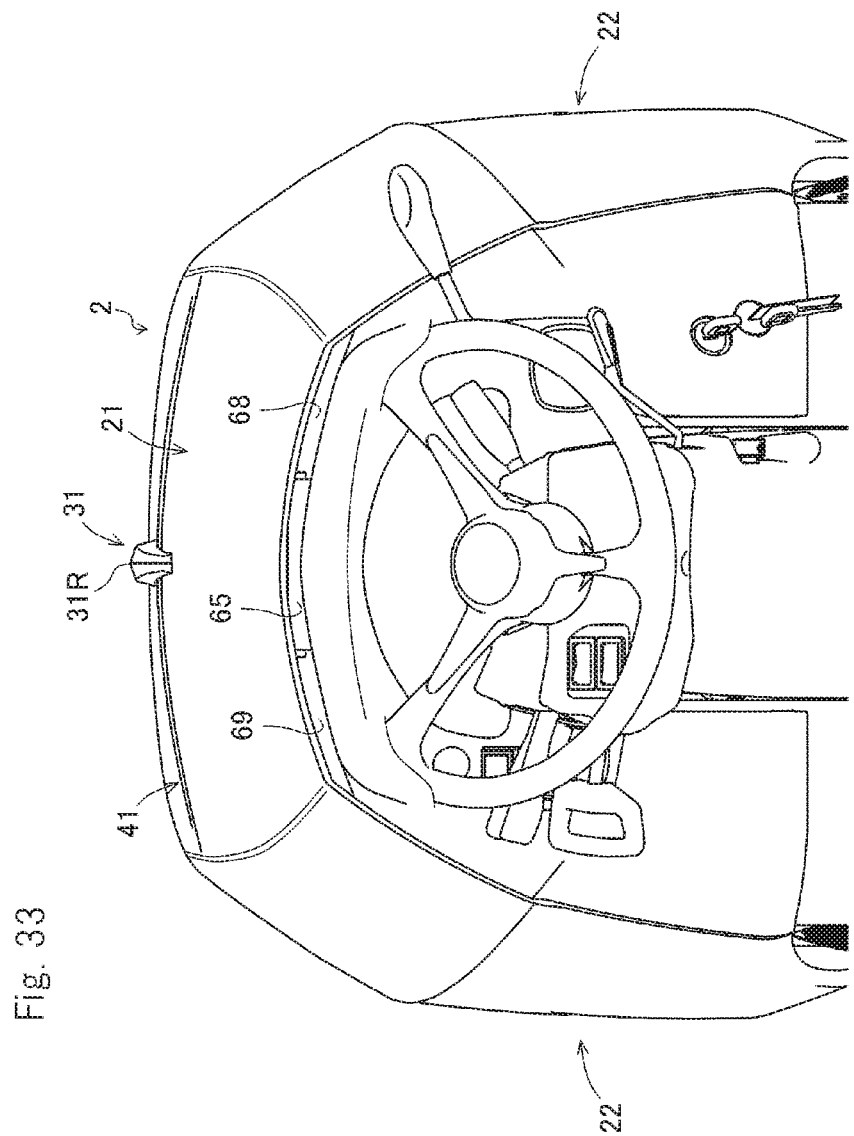
FIG. 33 is a drawing of a spectacle in which the closed hood is looked from a cabin.

FIG. 30 shows the state in which the hood 2 is opened. FIG. 31 shows the state in which the hood 2 is closed. FIG. 32 is a drawing in which an area P in FIG. 31 is expanded. FIG. 33 shows a spectacle in which the closed hood 2 is looked by an operator.

Inside the hood 2, an air cut plate 26 is housed. The air cut plate 26 is arranged so as to close a rear end of the hood 2, thereby preventing heat and noise of the engine 12 from being transmitted to the cabin 16. The air cut plate 26 supports the hood hinge 65.

Furthermore, inside the hood 2, a side beam 27 is housed. The side beam 27 is arranged perpendicularly to the air cut plate 26 so as to prevent a heat exchanger 12R of the engine 12 from vibrating. The side beam 27 supports a heat insulation plate 12H.

Additionally, inside the hood 2, a gas spring 28 is housed. One of ends of the gas spring 28 is attached to the side beam 27. The other end of the gas spring 28 is attached to the middle member 62. The gas spring 28 biases the middle member 62 upward. Accordingly, the hood 2 can be opened by being pushed up lightly.

The upper cover 21 is applied thereon with a moment M1 so as to be rotated downward by prudence (see FIG. 30). Oppositely, the upper cover 21 is applied thereon with a moment M2 so as to be rotated upward by the gas spring 28 (see FIG. 30). Accordingly, rigidity enough not to be distorted by the two opposite moments M1 and M2 is required in the upper cover 21. It is known that when the rigidity of the upper cover 21, fine operability cannot be obtained. For example, the hood 2 vibrates fractionally when the hood 2 is closed, and tone quality at the time of closing the hood 2 worsens.

Next, structural characteristics of the hood 2 are explained.

As a first characteristic, the center beam 631 connects the middle member 62 to the end member 63 (see FIG. 20). Namely, one of ends of the center beam 631 is attached to the middle member 62, and the other end thereof is attached to the end member 63.

As the above, the hood 2 according to the present invention has the center beam 631. The center beam 631 connects the middle member 62 to the end member 63. Accordingly, in the hood 2, the rigidity of the upper cover 21 is improved, whereby the hood 2 is not distorted. Furthermore, fine operability of the hood 2 can be obtained.

As a second characteristic, the hood hinge 65 is attached to the end member 63 and the center beam 631 (see FIG. 21). Namely, one of ends of the hood hinge 65 is attached to the end member 63, and the other end thereof is attached to the center beam 631.

As the above, the hood 2 according to the present invention has the hood hinge 65. The hood hinge 65 is attached to the end member 63 and the center beam 631. Accordingly, in the hood 2, stress according to the moments M1 and M2 is not accumulated near the end member 63 and is dispersed near the middle member 62, whereby the hood 2 is not distorted.

As a third characteristic, the weather strip 68 is attached to the end member 63 and contacts the air cut plate 26 arranged near the end member 63 (see FIGS. 27 and 32). Namely, the weather strip 68 closes a gap between the end member 63 and the air cut plate 26 while being attached to the end member 63. Longitudinal positions of the air cut plate 26 at the right and left sides of the hood hinge 65 are different (see FIG. 27). When a part of the air cut plate 26 at the right side of the hood hinge 65 is referred to as "air cut plate 26R", the weather strip 68 closes a gap between the end member 63 and the air cut plate 26R.

As the above, the hood 2 according to the present invention has the weather strip 68. The weather strip 68 is attached to the end member 63 and contacts the air cut plate 26 (26R) arranged near the end member 63. Accordingly, in the hood 2, an attachment position of the weather strip 68 is clear and attachment work of the weather strip 68 is easy. When an operator looks into an inner side of the upper cover 21, the engine 12 and the like cannot be cannot be seen because they are covered by the weather strip 68, whereby fine appearance of the hood 2 can be realized (see FIG. 33).

Additionally, in the tractor 1 having the hood 2, by considering a shape of the weather strip 68 (by shortening the weather strip 68 so as to provide a gap intentionally or the like), air can passes through a predetermined position. Accordingly, the gap between the end member 63 and the air cut plate 26 (26R) serves as an air passage, whereby heat of the engine 12 is hard to be accumulated. In this case, in comparison with the case in which an air passage is provided in the upper cover 21, water and dust is harder to enter the inside of the hood 2.

As a fourth characteristic, the weather strip 69 is attached to the support plate 64 and contacts the air cut plate 26 arranged near the support plate 64 (see FIGS. 27 and 32). Namely, the weather strip 69 closes a gap between the support plate 64 and the air cut plate 26 while being attached to the support plate 64. The longitudinal positions of the air cut plate 26 at the right and left sides of the hood hinge 65 are different (see FIG. 27). When a part of the air cut plate 26 at the left side of the hood hinge 65 is referred to as "air cut plate 26L", the weather strip 69 closes a gap between the end member 63 and the air cut plate 26L.

As the above, the hood 2 according to the present invention has the weather strip 69 and the support plate 64. The weather strip 69 is attached to the support plate 64 and contacts the air cut plate 26 (26L) arranged near the support plate 64. Accordingly, in the hood 2, an attachment position of the weather strip 69 is clear and attachment work of the weather strip 69 is easy. When an operator looks into an inner side of the upper cover 21, the engine 12 and the like cannot be cannot be seen because they are covered by the weather strip 69, whereby fine appearance of the hood 2 can be realized (see FIG. 33).

Additionally, in the tractor 1 having the hood 2, by considering a shape of the weather strip 69 (by shortening the weather strip 69 so as to provide a gap intentionally or the like), air can passes through a predetermined position. Accordingly, the gap between the support plate 64 and the air cut plate 26 (26L) serves as an air passage, whereby heat of the engine 12 is hard to be accumulated. In this case, in comparison with the case in which the air passage is provided in the upper cover 21, water and dust is harder to enter the inside of the hood 2.

A structure reducing cost of the hood 2 is explained below.

Figure 35:
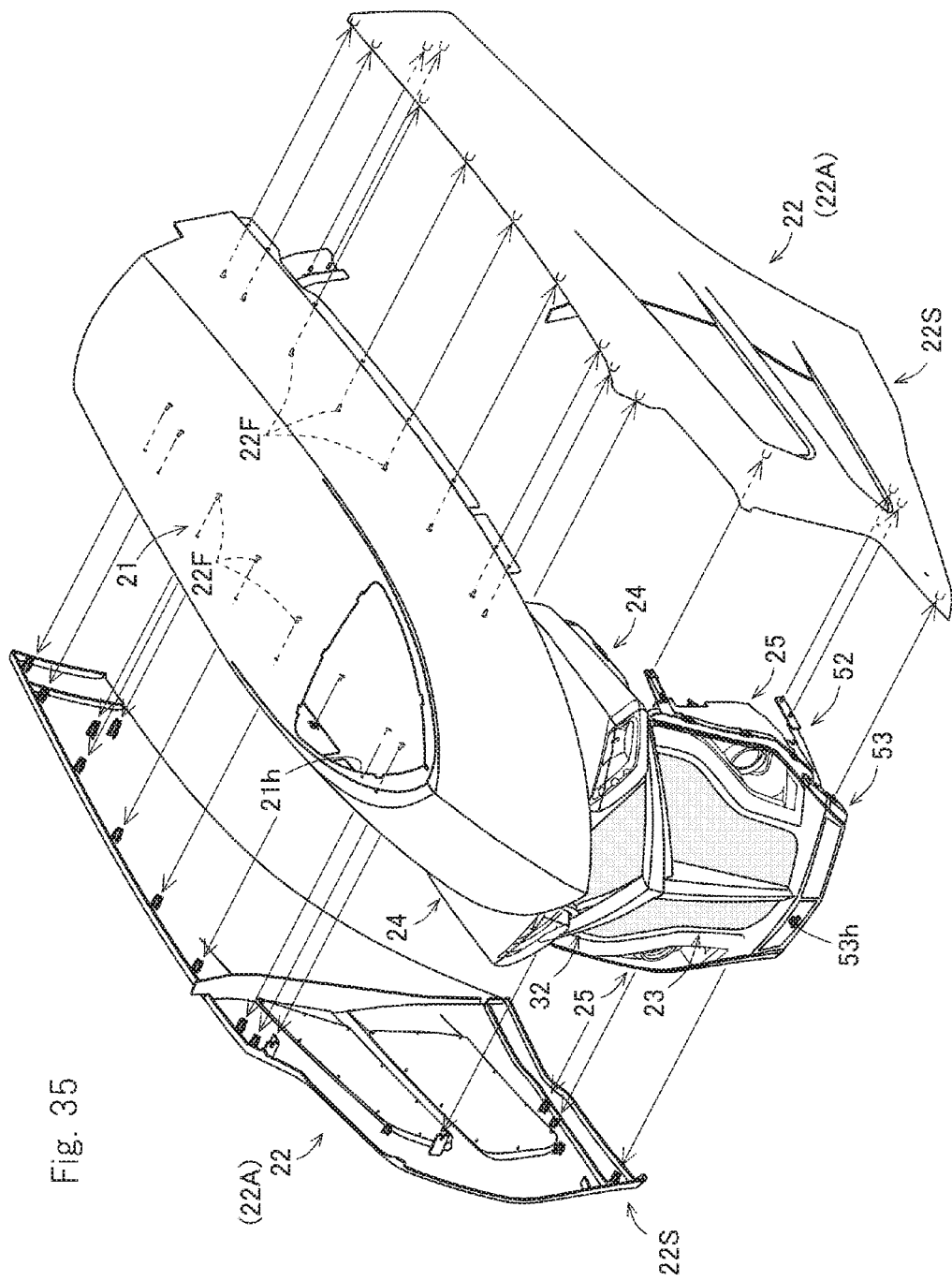
FIG. 35 is a drawing of an attachment process of the lower cover.
Figure 36:
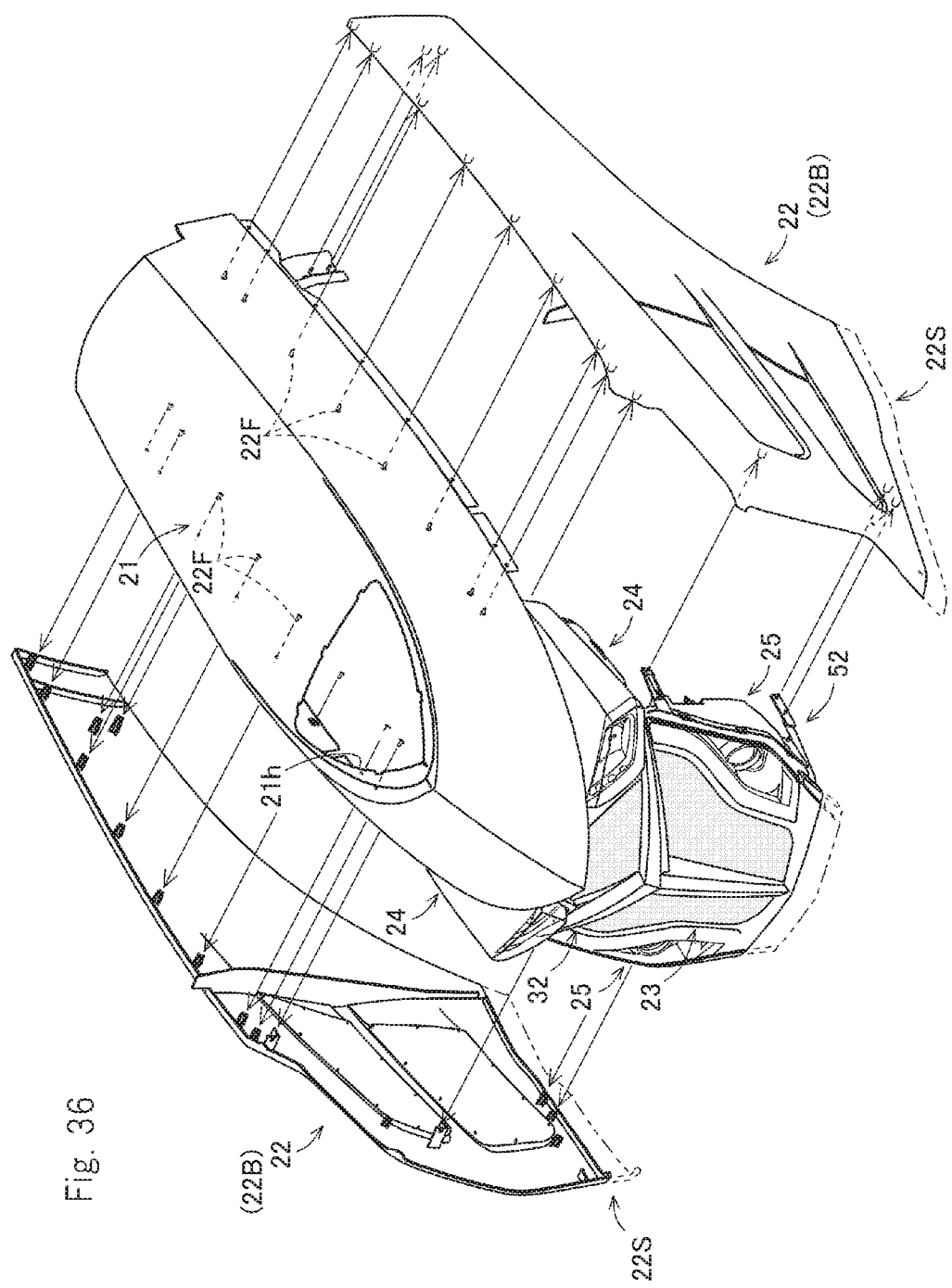
FIG. 36 is a drawing of an attachment process of the lower cover.

FIGS. 34A and 34B show two lower covers 22A and 22B. FIG. 35 shows an attachment process of the lower cover 22A, and FIG. 36 shows an attachment process of the lower cover 22B. FIGS. 37A and 37B show the state in which the hoods 2 are completed.

The lower cover 22 has a skirt part 22S extended downward. There are the lower cover 22 having the long skirt part 22S and the lower cover 22 having the short skirt part 22S. Herein, the lower cover 22 having the long skirt part 22S is referred to as "the lower cover 22A" (see FIG. 34(A)), and the lower cover 22 having the short skirt part 22S is referred to as "the lower cover 22B" (see FIG. 34(B)).

In the lower cover 22A, the skirt part 22S is long and a lower side of the skirt part 22S has the same height as a lower side of the under spacer 53. In other words, a lower side of the lower cover 22A contacts a virtual line Lv extended from the lower side of the under spacer 53. Accordingly, the under spacer 53 is indispensable to the hood 2 configured by the lower cover 22A. Accordingly, in a process of attaching the lower cover 22A, the under spacer 53 is arranged below the front grill 23 (see FIG. 35).

In the lower cover 22B, the skirt part 22S is short and a lower side of the skirt part 22S has the same height as a lower side of the front grill 23. In other words, a lower side of the lower cover 22B contacts a virtual line Lv extended from the front grill 23. Accordingly, the under spacer 53 is unnecessary for the hood 2 configured by the lower cover 22B. Accordingly, in a process of attaching the lower cover 22B, the under spacer 53 is not arranged below the front grill 23 (see FIG. 36).

According to the above, the upper cover 21 and the front grill 23 can be used in at least two models. In detail, in addition to the upper cover 21 and the front grill 23, the light units (24 and 25) can also be used in at least two models (see FIGS. 37A and 37B). Furthermore, the center pillar 51 and the side frame 52 constituting the hood 2 can also be used in at least two models naturally.

Next, characteristics of the hood 2 are explained.

As a first characteristic, the upper cover 21 and the front grill 23 can be used in at least two models by changing the length of the skirt part 22S of the lower cover 22 (see FIGS. 34A and 34B to 37A and 37B). Accordingly, the upper cover 21 and the front grill 23 can be used in at least two models, whereby quantity of production is increased and reduction of is expected (it is called mass production effect).

As the above, the upper cover 21 and the front grill 23 can be used in at least two models by changing the length of the skirt part 22S of the lower cover 22. Accordingly, by the mass production effect of the upper cover 21 and the front grill 23, the cost of the hood 2 can be reduced.

As a second characteristic, when the skirt part 22S is long, the under spacer 53 is arranged below the front grill 23. The lower side of the lower cover 22A contacts the virtual line Lv extended from the lower side of the under spacer 53 (see FIGS. 34 A and 34B). Accordingly, a height dimension of the hood 2 is increased, whereby the hood 2 is suitable for a model on which the large engine 12 is mounted.

As the above, when the skirt part 22S is long, the lower side of the lower cover 22 (22A) contacts the virtual line Lv extended from the lower side of the under spacer 53. Accordingly, the hood 2 can be used for the model on which the large engine 12 is mounted without spoiling appearance, and the upper cover 21 and the front grill 23 can be used in at least two models.

As a third characteristic, when the skirt part 22S is short, the under spacer 53 is not arranged below the front grill 23. The lower side of the lower cover 22B contacts the virtual line Lv extended from the lower side of the front grill 23 (see FIGS. 34 A and 34B). Accordingly, a height dimension of the hood 2 is reduced, whereby the hood 2 is suitable for a model on which the small engine 12 is mounted.

As the above, when the skirt part 22S is short, the lower side of the lower cover 22 (22B) contacts the virtual line Lv extended from the lower side of the front grill 23. Accordingly, the hood 2 can be used for the model on which the small engine 12 is mounted without spoiling appearance, and the upper cover 21 and the front grill 23 can be used in at least two models.

As a fourth characteristic, in the under spacer 53, one or more through holes 53h are provided (see FIGS. 35 and 37). Accordingly, the one or more through holes 53h permit air to flow from the inside of the hood 2 to the outside or from the outside to the inside thereof.

As the above, in the under spacer 53, the one or more through holes 53h are provided. Accordingly, in the hood 2, the under spacer 53 serves as serves as an air passage, whereby heat of the engine 12 is hard to be accumulated.

The present invention can be used for an art of a hood and a tractor having the hood.

DESCRIPTION OF REFERENCE SIGNS 1, tractor
11, chassis frame
12, engine
13. transmission
14, front axle
15, rear axle
16, cabin
2, hood
21, upper cover
21h, opening
22, lower cover
22A, lower cover
22B, lower cover
22S, skirt part
23, front grill 231, grill frame
232, metal mesh
24, high-beam light unit (light unit)
25, low-beam light unit (light unit)
26, air cut plate
27, side beam
28, gas spring
31, center mark
31R, ridgeline
32, symbol mark
41, design panel
41h, through hole
51, center pillar
52, side frame
53, under spacer
53h, through hole
61, tip member
62, middle member
63, end member
631, center beam
64, support plate
65, hood hinge
66, weather strip
67, weather strip
68, weather strip
69, weather strip
Tr, target route
r, ridge

The invention claimed is:

1. A tractor comprising:
a front grill formed in a mesh-like manner and configured with one or more openings through which outside air can pass to reach an engine; and
a plurality of light units including a pair of left and right upper light units and a pair of left and right lower light units; and
wherein:
the pair of left and right upper light units are positioned at an upper portion of the front grill; and
the pair of left and right lower light units are positioned at a lower portion of the front grill and oriented in a direction of forward travel of the tractor.

2. The tractor according to claim 1, further comprising a pair of lower covers positioned at left and right sides of the front grill.

3. The tractor according to claim 2, wherein each lower cover of the pair of lower covers defines one or more corresponding side openings.

4. The tractor according to claim 1, further comprising an upper cover positioned at the upper portion of the front grill.

5. The tractor according to claim 4, wherein a front part of the upper cover is provided with an upper opening.

6. A tractor hood comprising:
a front grill including a mesh material defining one or more openings configured to enable airflow through the front grill and into a hood cavity;
a first upper light unit and a second upper light unit, an upper portion of the front grill positioned between the first upper light unit and the second upper light unit; and
a first lower light unit and a second lower light unit, a lower portion of the front grill positioned between the first lower light unit and the second lower light unit,
wherein, when the tractor hood is installed on a tractor, the first and second lower light units are each oriented in a direction of forward travel of the tractor.

7. The tractor hood of claim 6, further comprising a first lower cover extending from a first side portion of the front grill, the first lower cover defining one or more first openings.

8. The tractor hood of claim 7, further comprising a second lower cover extending from a second side portion of the front grill, the second side portion of the front grill opposite the first side portion of the front grill, and the second lower cover defining one or more second openings.

9. The tractor hood of claim 8, further comprising an upper cover including:
a first end positioned adjacent to and extending from the upper portion of the front grill;
a second end that is opposite the first end; and
a plurality of holes configured to enable outside air to communicate with the hood cavity through the upper cover.

10. The tractor hood of claim 9, wherein:
the plurality of holes includes a first set of holes and a second set of holes; and
the first set of holes and the second set of holes are separated by a center ridgeline associated with the upper cover.

11. The tractor hood of claim 10, wherein the center ridgeline bisect the first set of holes and the second set of holes.

12. The tractor hood of claim 9, wherein the upper cover, the first lower cover, and the second lower cover are each separate discrete components.

13. The tractor hood of claim 6, wherein:
a first side portion of the front grill is interposed between the first upper light unit and the first lower light unit; and
a second side portion of the front grill is interposed between the second upper light unit and the second lower light unit.

14. The tractor hood of claim 6, further comprising an upper cover including:
a first end extending from the upper portion of the front grill;
a second end that is opposite the first end; and
a panel defining a plurality of holes configured to enable outside air to communicate with the hood cavity through the plurality of holes.

15. The tractor hood of claim 14, further comprising:
a ridgeline that extends from the first end of the upper cover along at least a portion of a center line of the upper cover; and
wherein the ridgeline is positioned between a first set of holes of the plurality of holes and a second set of holes of the plurality of holes.

16. A tractor hood comprising:
a grill including a mesh material defining a plurality of first holes;
a first cover portion positioned above the grill;
a second cover portion; and
a third cover portion, the grill positioned between the second cover portion and the third cover portion; and
multiple light units including:
a first light unit positioned between the grill and the second cover portion;
a second light unit positioned between the grill and the third cover portion;
a third light unit positioned between the grill and the second cover portion, and between the first cover portion and the first light unit; and a fourth light unit positioned between the grill and the third cover portion, and between the first cover portion and the second light unit; and where the grill, the first cover portion, the second cover portion, and the third cover portion cooperate to define a hood cavity associated with an engine.

17. The tractor hood of claim 16, wherein:

a first portion of the grill is interposed between the third light unit and the fourth light unit;

a second portion of the grill is interposed between the first light unit and the third light unit;

a third portion of the grill is interposed between the second light unit and the fourth light unit; and a fourth portion of the grill is interposed between the first light unit and the fourth light unit, and interposed between the second light unit and the third light unit.

18. The tractor hood of claim 17, wherein the first cover portion includes:

a first end coupled to the first portion of the grill;

a second end that is opposite the first end; and a one or more first openings configured to enable air to communicate with the hood cavity.

19. The tractor hood of claim 18, wherein:

wherein the plurality of first holes configured to enable air into the hood cavity via the grill;

the second cover portion defines one or more second openings configured to enable air to communicate with the hood cavity through the second cover portion; and the third cover portion defines one or more third openings configured to enable air to communicate with the hood cavity through the third cover portion.

20. The tractor hood of claim 19, wherein:

the one or more first openings are positioned closer to the first end of the first cover portion than to the second end;

the first cover portion is distinct from the second cover portion, the third cover portion, or both; and the first cover portion, the second cover portion, and the third cover portion are coupled to the grill.

* * * * *